(12) United States Patent
Valdez, Jr.

(10) Patent No.: US 6,426,778 B1
(45) Date of Patent: Jul. 30, 2002

(54) SYSTEM AND METHOD FOR PROVIDING INTERACTIVE COMPONENTS IN MOTION VIDEO

(75) Inventor: Luis J. Valdez, Jr., Boston, MA (US)

(73) Assignee: Avid Technology, Inc., Tewksbury, MA (US)

(*) Notice: Subject to any disclaimer, the term of this patent is extended or adjusted under 35 U.S.C. 154(b) by 0 days.

(21) Appl. No.: 09/054,861

(22) Filed: Apr. 3, 1998

(51) Int. Cl.[7] ................................................. H04N 7/08
(52) U.S. Cl. ...................... 348/461; 348/473; 348/478; 348/563; 725/136; 345/723
(58) Field of Search ................................ 348/461, 460, 348/473, 478, 563, 564, 12, 13, 17; 345/327, 328; 725/136, 112, 95, 101; H04N 7/08, 7/087

(56) References Cited

U.S. PATENT DOCUMENTS

| 5,045,940 A | * | 9/1991 | Peters et al. | 358/13 |
| 5,267,351 A | * | 11/1993 | Reber et al. | 395/600 |
| 5,537,141 A | * | 7/1996 | Harper et al. | 348/12 |
| 5,541,662 A | * | 7/1996 | Adams et al. | 348/460 |
| 5,561,457 A | * | 10/1996 | Cragun et al. | 348/13 |
| 5,585,858 A | * | 12/1996 | Harper et al. | 348/485 |
| 5,617,146 A | * | 4/1997 | Duffield et al. | 348/460 |
| 5,752,029 A | * | 5/1998 | Wissner | 395/615 |
| 5,764,275 A | * | 6/1998 | Lappington et al. | 348/12 |

(List continued on next page.)

FOREIGN PATENT DOCUMENTS

| EP | 0 596 823 A2 | 5/1994 |
| WO | WO 96/36007 | 11/1996 |
| WO | WO 97/12342 | 4/1997 |
| WO | WO 97/37497 | 10/1997 |
| WO | WO 98/04984 | 2/1998 |

OTHER PUBLICATIONS

Hung, Yung–Chen, "A Hypervideo System Generator," Software Practice & Experience, vol. 27, No. 11, Nov. 1997, pp. 1263–1281.

Tonomura, Yoshinobu, "Video Handling Based on Structured Information for Hypermedia Systems," Proceedings of the Int'l Conference of Multimedia Information Systems, Jan. 1991, pp. 333–334.

Hirata, Kyoji, et al., "Content–Oriented Integration in Hypermedia Systems," Hypertext '86, 7th ACM Conference on Hypertext, Conf. 7, Mar. 1996, pp. 11–21.

(List continued on next page.)

Primary Examiner—John W. Miller
Assistant Examiner—Jean W. Désir
(74) Attorney, Agent, or Firm—Peter J. Gordon

(57) ABSTRACT

An editing system and delivery system synchronizes the transmission of interactive elements with a video signal, such that the interactive components may supplement information provided in the video signal at predefined periods. The interactive elements are transmitted in relation to the video such that the interactive elements will arrive in time to display the components concurrently with a portion of the video presentation. The interactive elements may be transmitted within a video signal to a viewer. The viewer is configured to display the interactive elements in response to a signal from the delivery system. An editing system is disclosed that may define a programming track for interactive elements that may be associated with one or more audio and video tracks. The editing system schedules transmission and appearance of the elements. A graphical user interface of the editing system may display a time in a presentation timeline when the interactive elements appear and the duration which the interactive elements are displayed. Graphical user interface representations of the interactive elements are translated into commands including file transfer instructions to be executed on a playback system. The playback system may transmit information element data within a video signal to a viewer.

45 Claims, 13 Drawing Sheets

U.S. PATENT DOCUMENTS

| | | | | |
|---|---|---|---|---|
| 5,826,102 | A | * 10/1998 | Escobar et al. | 395/806 |
| 5,861,881 | A | * 1/1999 | Freeman et al. | 345/302 |
| 5,892,507 | A | * 4/1999 | Moorby et al. | 345/302 |
| 5,907,366 | A | * 5/1999 | Farmer et al. | 348/478 |
| 5,977,962 | A | * 11/1999 | Chapman et al. | 345/327 |
| 5,982,445 | A | * 11/1999 | Eyer et al. | 348/461 |
| 6,037,932 | A | * 3/2000 | Feinleib | 348/327 |
| 6,092,122 | A | * 7/2000 | Liu et al. | 709/277 |

OTHER PUBLICATIONS

Ackermann, Phillipp, "Design and Implementation of an Object–oriented Media Composition Framework", Int'l. Computer Music Conference, 1994.

Baecker, Ronald, et al., "A Multimedia System for Authoring Motion Pictures", ACM Multimedia 1996, pp. 31–42.

Blakowski, Gerold, et al., "Tools for Specifying and Executing Synchronized Multimedia Presentations", Proc. $2^{nd}$ Int'l. Workshop on OS for Digital Audio Video, Nov. 18–19, 1991, pp. 271–279.

Buchanan, M. Cecelia, et al, "Automatic Temporal Layout Mechanisms", Proc. ACM Multimedia 1993, pp. 341–350.

Buchanan, M. Cecelia, et al., "Specifying Temporal Behavior in Hypermedia Documents", ECHT '92, pp. 262–271.

Buford, John F., "Integrating Object–Oriented Scripting Languages with HyTime", from Proceedings of ICMCS 1994 IEEE, pp. 1–10.

Bulterman, Dick C.A., et al, "Multimedia Authoring Tools: State of the Art and Research Challenges", LNCS 1000, 1995, pp. 1–17.

"The Coming Revolution", Communications of the ACM, Jul. 1989, vol. 32, No. 7, pp. 794–801.

Drapeau, George D. et al, "MAEstro—A Distributed Multimedia Authoring Environment", USENIX, Summer 1991, pp. 315–328.

Drapeau, George D., "Synchronization in the MAEstro Multimedia Authoring Environment", ACM Multimedia 1993, pp. 331–340.

Eun, Seong Bae, et al, "Specification of Multimedia Composition and A Visual Programming Environment", Dept. of Computer Science, Center for Artificial Intelligence Research, Korea Advanced Institute of Science and Technology, pp. 1–8.

Gibbs, Simon, "Composite Multimedia and Active Objects", in Proc. OOPSLA 1991, pp. 1–16.

Gibbs, Simon, "Data Modeling of Time–Based Media", SIGMOD '94, 1994 ACM, pp. 91–102.

Gibbs, Simon, "Video Nodes and Video Webs: Uses of Video in Hypermedia", Proc. ACM Conference on Hypertext, 1992, p. 3.

Hardman, Lynda, et al, "Authoring Interactive Multimedia: Problems and Prospects", CWI Quarterly, vol. 7(1) 1994, pp. 47–66.

Hardman, Lynda, et al, "Structured Multimedia Authoring", ACM Multimedia 1993, pp. 283–289.

Herman, I., et al, "MADE: A Multimedia Application Development Environment", CWI Quarterly, vol. 7(1) 1994, pp. 27–46.

Hirzalla, Nael, et al, "A Temporal Model for Interactive Multimedia Scenarios", in IEEE Multimedia, vol. 2, No. 3, Fall 1995, pp. 24–31.

Hudson, Scott E., et al, "The Walk–Through Approach To Authoring Multimedia Documents", Multimedia '94, 1994 ACM, pp. 173–180.

Koegel, John F., et al, "Improving Visual Programming Languages for Multimedia Authoring", World Conference on Educational Multimedia and Hypermedia, Jun. 1993, Proc. of ED–MEDIA 93, pp. 286–293.

Kurlander, David, et al, "A Visual Language for Browsing, Undoing, and Redoing Graphical Interface Commands", in Visual Languages and Visual Programming, 1990, pp. 257–275.

Mackay, Wendy E., et al, "Virtual Video Editing in Interactive Multimedia Applications", Communications of the ACM, Jul. 1989, vol. 32, No. 7, pp. 802–810.

Matthews, James, et al, "VideoScheme: A Programmable Video Editing System for Automation and Media Recognition", ACM Multimedia 1993.

Pazandak, Paul, et al, "A Multimedia Temporal Specification Model and Language", University of Minnesota Technical Report 94–33, 1994, pp. 1–39.

Ryan, Mark, et al, "A Development Process for Large Multimedia Titles", 1994 ACM, pp. 126–138.

Stochi, A., et al, "The Integrator: A Prototype for Flexible Development of Interactive Digital Multimedia Applications", Interactive Multimedia, vol. 2, No. 3, 1993, pp. 5–26.

Wahl, Thomas, et al, "Representing Time in Multimedia Systems", Proc. IEEE Int'l.Conference on Multimedia, 1994, pp. 538–543.

Wahl, Thomas, et al, "Tiempo: Temporal Modeling and Authoring of Interactive Multimedia", Proc. Int'l Conference of Multimedia, 1995, pp. 274–277.

* cited by examiner

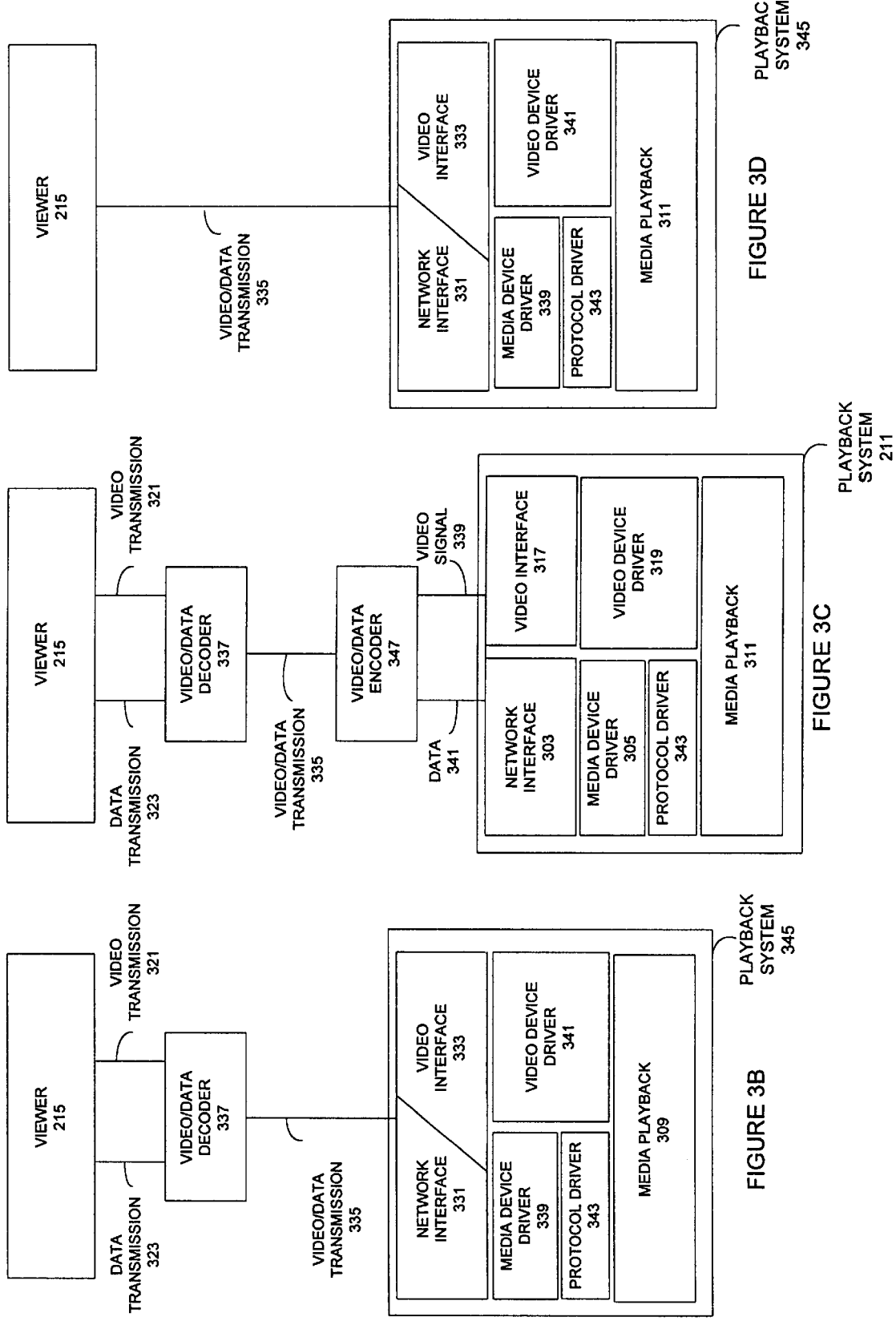

| Name | CFPS | Creation Date | Disk | End |
|---|---|---|---|---|
| Baby Seals | 30.00 | 6/26/97 6:49:34 PM | Media | 00: |
| Plane Crash | 30.00 | 6/26/97 4:11:10 PM | Media | 00: |
| Waterworks | 30.00 | 6/26/97 4:09:42 PM | Media | 00: |
| Shooting Star | 30.00 | 6/12/97 5:07:11 PM | Media | 00: |
| Mercury Rocket | 30.00 | 6/12/97 5:06:57 PM | Media | 00: |
| main.html | | 6/30/97 6:17:03 PM | Avid | |
| showbgo.gif | | 6/30/97 6:17:03 PM | Avid | |
| links.html | | 6/30/97 6:17:03 PM | Avid | |
| fanclubbutton.gif | | 6/30/97 6:17:03 PM | Avid | |

FIGURE 6B

SYSTEM AND METHOD FOR PROVIDING INTERACTIVE COMPONENTS IN MOTION VIDEO

FIELD OF THE INVENTION

The present invention relates generally to a system and method for providing interactive components, such as markup language elements in motion video.

BACKGROUND OF THE INVENTION

Generally, computer systems exist for editing, playing, and broadcasting motion video. One such editing and playback system is the Media Composer video production system provided by Avid Technology, Inc. (Media Composer is a registered trademark of Avid Technology, Inc.). These computer systems typically digitize one or more video and audio tracks and store them on computer storage media, such as a hard disk device. Software systems may then modify, combine, or enhance these video and audio tracks to produce a broadcast-quality production, such as a motion picture or newscast. These systems may include editing software that may allow a user to select different segments of audio and video, prepare clips for replay, and perform splicing between clips, among other functions.

Computer systems also exist that are capable of displaying interactive documents having interactive elements. In particular, markup languages allow a user to define a number of different types of elements within an interactive document, some of which are capable of handling interactions with a user. Interactions may include selecting an interactive element within the displayed electronic document, using a pointing device such as a mouse. Such elements may include a predefined area of a still picture or a series of text. A user may also input information into a displayed element, using the keyboard or other input device. When a user interacts with the document, the interactions may cause additional information to be displayed to the user.

Examples of markup languages generally used to produce interactive electronic documents include SGML, XML, HTML, and Dynamic HTML, among others. The Standard Generalized Markup Language ("SGML") is used to represent a wide variety of document types such as books, electronic software documentation, and equipment specifications, among other applications. SGML is an international standard (ISO-8879) published in 1986 for the electronic publication of documents. SGML defines a markup language wherein content of a document is structured using markup, i.e., tags or codes encapsulating the content. The markup defines elements which form a logical, predictable structure. SGML defines a strict markup scheme with a syntax for defining document elements and an overall framework for marking up documents. A document type definition (DTD) of SGML establishes the structure of a markup document of a particular type, and provides a framework for the kinds of elements that constitute a document of that type. The markup of a document is interpreted as an ordered hierarchy of markup elements which when, taken together, form a tree or similar hierarchial object. A markup element describes the function or meaning of the content which it includes.

In such a document, markup elements include tags and their content, such as text, graphics, still images or other media. A markup language document includes markup tags that may be described as start tags, end tags, or empty tags. A start tag begins a markup element. An end tag ends the corresponding markup element. These start tags and end tags define the element in markup languages, such as a book, library, or body of a document. An empty tag is understood as being both a start tag and an end tag with no content between the start and end tags. Between a start tag and an end tag other start tags and corresponding end tags may be arranged in a hierarchial manner such that there are children elements and parent elements having a defined relationship to each other. These elements may define a series of interactive elements that may receive user input. Such elements may include buttons, menus, text fields, graphics, links to other documents or other interactive markup elements as defined by the markup language. When a user provides input to these elements through a document viewer/browser interface, the viewer may respond by modifying, transmitting, or receiving displayed or stored data.

Also in markup language documents, there are elements that contain metadata, or information about the document. Metadata may describe document information such as location, name, and creation date of an electronic document that may accompany the document or may be embedded in the document itself. Metadata is typically used to catalogue electronic documents or otherwise identify information relative to an electronic document.

Hypertext Markup Language (HTML), extensible Markup Language (XML) and Dynamic HTML define particular document types that conform to SGML by having a definitive DTD. HTML, XML, and Dynamic FITML are widely used over the Internet for distributing information between servers and clients. These markup language document types may be edited, viewed and verified according to their respective DTDs. By distributing markup language documents through networks such as the Internet, information providers can make information available to a large number of consumers. These interactive documents are generally transferred between a "server", or provider system, and a "client", or consumer system over a communication network. In the Internet, documents may be transferred using a transfer protocol referred to in the art as the Hypertext Transfer Protocol (HTTP). This application-layer protocol uses a network-layer transport protocol such as the well-known Transmission Control Protocol/Internet Protocol (TCP/IP) to transfer these documents over the network between a server and a client. When transmitting information to many clients, a protocol vehicle referred to as multicast is used to transfer information economically. Multicast, TCP/IP, and HTTP are well-known in the art of computer communications protocols.

Documents may be distributed over various types of networks, such as Ethernet, Fast Ethernet, ATM, FDDI, dial-up networks, among others. Documents may also be broadcast or multicast to multiple users over a network such as a video broadcast network. Specifically, documents may be transmitted within a video signal, such within a vertical blanking interval signal (VBI) of a video transmission signal. The VBI is the section of the video signal that may be used for transmitting data, such as closed-captioning information. One such method of transmitting multimedia data over networks and within video signals is disclosed in the Broadcast-Enabled PC Software Development Kit provided by the Microsoft Corporation. The software development kit and its associated library functions provide a facility for transmitting multicast IP data to a number of clients over a variety of network interfaces.

Markup language documents are generally viewed using a software program referred to in the art as a browser or viewer. A browser interprets a series of elements of a markup language document as browser instructions. The elements contain text or images, and a number of formatting commands, when interpreted, change the appearance of text or images within the display generated by the browser. Browsers typically interpret interactive markup language elements and handle input and output events associated with these interactive elements. Examples of browsers include the Navigator and Microsoft Explorer browser programs provided by the Netscape Corporation and the Microsoft Corporation, respectively (Navigator is a registered trademark of the Netscape Corporation). These browsers are software systems that are generally installed on a computer and computer user to enable the computer to view and edit markup language documents.

Another system for viewing markup language documents is the WebTV browser provided by WebTV Networks, Inc. and various other manufacturers (WebTV and WebTV Network are registered trademarks of WebTV Networks, Inc.). The WebTV Internet browser is a system that allows a user to browse markup language documents published on the Internet without the need for a computer. The WebTV Internet browser includes hardware connected to a standard television and phone line. The hardware obtains documents through the phone line using HTTP and TCP/IP protocols in a well-known manner. A recent improvement of the WebTV browser hardware, referred to as WebTV Plus hardware, allows a content provider to broadcast markup language documents. This improved WebTV hardware may display both video and markup language data on the screen at the same, to provide information such as stock information reports, channel guides, etc. The video information generally appears in one rectangular section of the screen reserved for displaying video in what is commonly referred to as "picture-in-picture" format, or in WebTV Plus, "Web PIP" format. This display of data in the rectangular section of the screen is independent of the display of data in other areas of the screen. The markup language document is displayed in a separate section of the screen and may receive interactive input from the user. A user may "flip" back and forth between the video information and markup language document that is displayed on the television screen.

SUMMARY OF THE INVENTION

Prior systems do not allow a user to associate interactive data with a video presentation in a time-based relationship over a distributed network. An editing system and delivery system is provided that synchronizes the transmission of interactive elements with a video signal, such that the interactive components may supplement information provided in the video signal at predefined periods. The interactive elements are transmitted in relation to the video such that the interactive elements will arrive in time to display the components concurrently with a portion of the video presentation. The interactive elements may be transmitted within a video signal to a viewer. The viewer is configured to display the interactive elements in response to a signal from the delivery system.

An editing system is disclosed that may define a programming track for interactive elements that may be associated with one or more audio and video tracks. The editing system schedules transmission and appearance of the elements. A graphical user interface of the editing system may display a time in a presentation timeline when the interactive elements appear and the duration which the interactive elements are displayed. Graphical user interface representations of the interactive elements are translated into commands including file transfer instructions to be executed on a playback system. The playback system may transmit information element data within a video signal to a viewer.

This ability to synchronize interactive elements with portions of a video presentation provides an audience an enhanced presentation experience. Audience users may then interact with the presentation they are watching, because various interactive elements are displayed to the user when a particular portion of the video presentation is played. A user then may interact with the interactive elements and receive more information associated with the presentation. The ability to provide interactive elements with a video presentation may be particularly useful for video training and presentations, newscasts, entertainment programs, and other viewing environments where a heightened viewing experience is desired.

According to one aspect, a method is provided for processing a video signal using an editing system program. The method involves of associating an interactive element to a portion of a video presentation to be transmitted and displayed on a viewer, wherein the interactive element has a predefined relationship to the portion and transmitting the interactive element to the viewer at a predetermined time relative to a transmission of the portion.

According to another aspect, a system and method is provided that determines a time relation between a video broadcast and an interactive video element. An interactive element is inserted into the video signal based on the time relation.

According to another aspect, method for transmitting a video signal is provided that receives a composition of a multimedia presentation, the composition including one or more interactive elements having a time relation to one or more video elements. The interactive elements are encoded within the video signal and the video signal is transmitted.

BRIEF DESCRIPTION OF THE DRAWINGS

In the drawings,

FIGS. 3B–3D show various embodiments of an editing and delivery system;

FIGS. 6B–6C are example display views produced by the editing system of FIGS. 2 and 3A–3D;

DETAILED DESCRIPTION

The present invention will be more completely understood through the following detailed description which should be read in conjunction with the attached drawing in which similar reference numbers indicate similar structures. All references cited herein are hereby expressly incorporated by reference.

Figure 1:
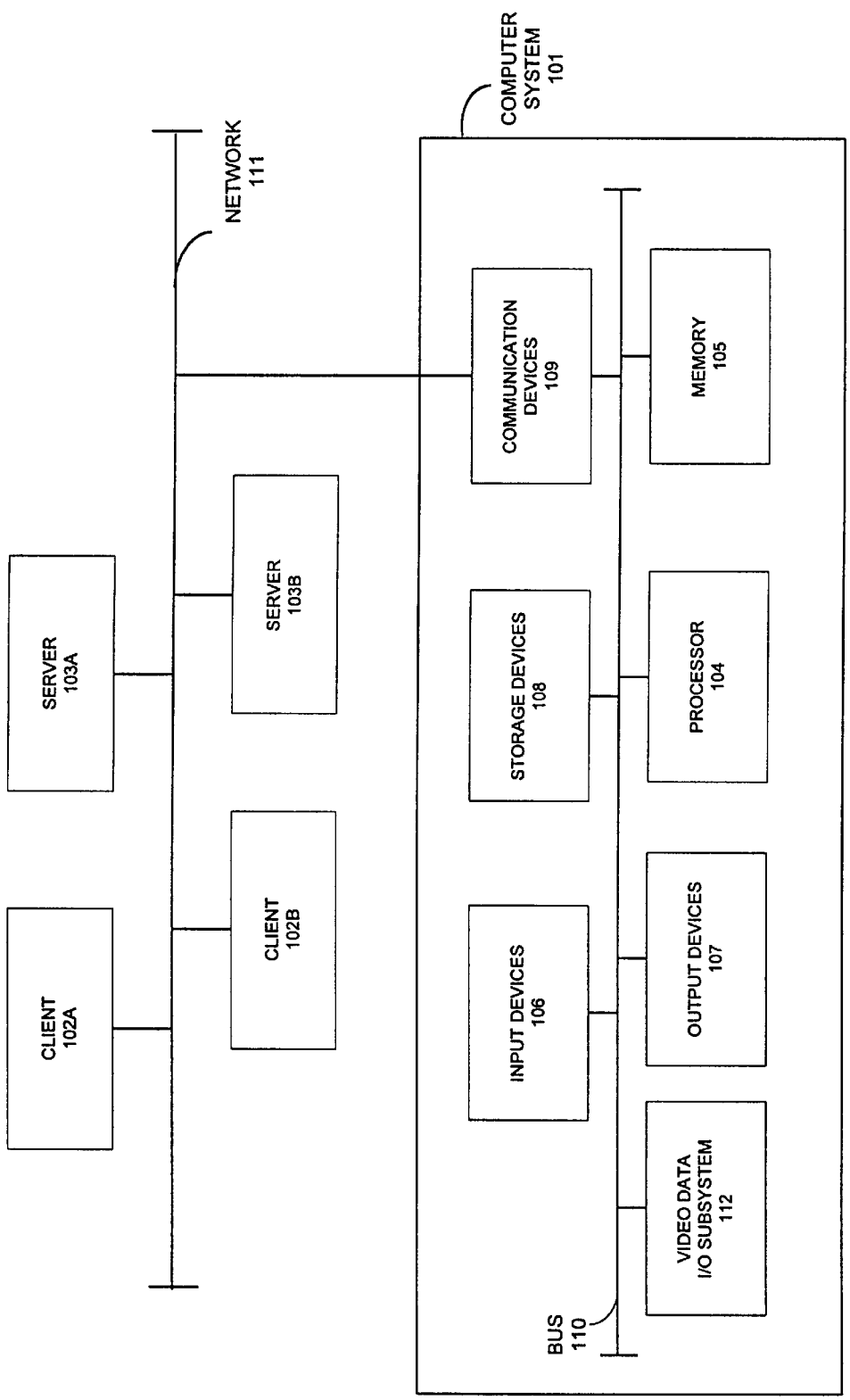
FIG. 1 is a block diagram of an exemplary computer system and network that may be suitable for implementing various exemplary embodiments.

An example computer system for implementing this system is depicted in FIG. 1. The computer system 101 includes a processor 104 having one or more storage devices 108, such as one of more disk drives. The computer system also includes one or more output devices 107, such as monitors or graphic displays (not shown), or printing devices (not shown). The computer system 101 typically includes a memory 105 for storing programs and data during operation of the computer system 101. In addition, the computer system may contain one or more communication devices 109 that connect to a communication network 111. Computer system 101 may also include a video data I/O subsystem 110 that can convert analog audio and video data into digital information. Subsystem 110 may also be capable of accepting digitized audio and video information directly for use by system 101. It should be understood that this system is merely one system that may be used, and thus the present invention is not limited to the specific systems described herein.

Computer system 101 may be a general purpose computer system, that is programmable using a high level computer programming language. The computer system may also be implemented using specially programmed, special purpose hardware. In the computer system 101, the processor 104 is typically a commercially available processor, such as the PENTIUM microprocessor from the Intel Corporation, PowerPC microprocessor, SPARC processor, PA-RISC processor, M68000 series microprocessor or MIPS processor. Many other processors are available. Such a processor usually executes an operating system which may be, for example, the DOS, WINDOWS 95, WINDOWS 98, WINDOWS NT, SYSTEM 7, SOLARIS, NetWare, InternetWare, IRIX, or UNIX operating system (WINDOWS is a registered trademark of the Microsoft Corporation, SYSTEM 7 is a registered trademark of the Apple Corporation, Solaris is a registered trademark of Sun Microsystems, Inc., IRIX is a trademark of the Silicon Graphics Corporation, MIPS is a registered trademark of MIPS Technologies, Inc., and NetWare and InternetWare are registered trademarks of the Novell Corporation.)

The communication network 111 may be an Ethernet or other type of local or wide area network (LAN or WAN), a point-to-point network provided by telephone services, or other type of communication network. Information consumers and providers referred to as server 102 and client 103 systems, respectively, communicate through the network 111 to exchange information. Computer system 101 may be configured to perform as a client 102 or server 103 system or both on the network 111. A server such as 103A may store markup language documents and/or video files on a storage device 108 located on the server though not shown. The server may also provide these documents and files to one or more client systems 102 in response to a request generated by a client such as 102A through the network 111. Similarly, markup language, video and audio files documents according to the present invention may be created, edited, viewed, or arranged on such client 102 and server 103 systems.

It should be understood that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

Having now described an exemplary computer system on which this system may be implemented, an editing and delivery system will now be described in more detail in connection with FIGS. 2 and 3A–3D.

Figure 2:
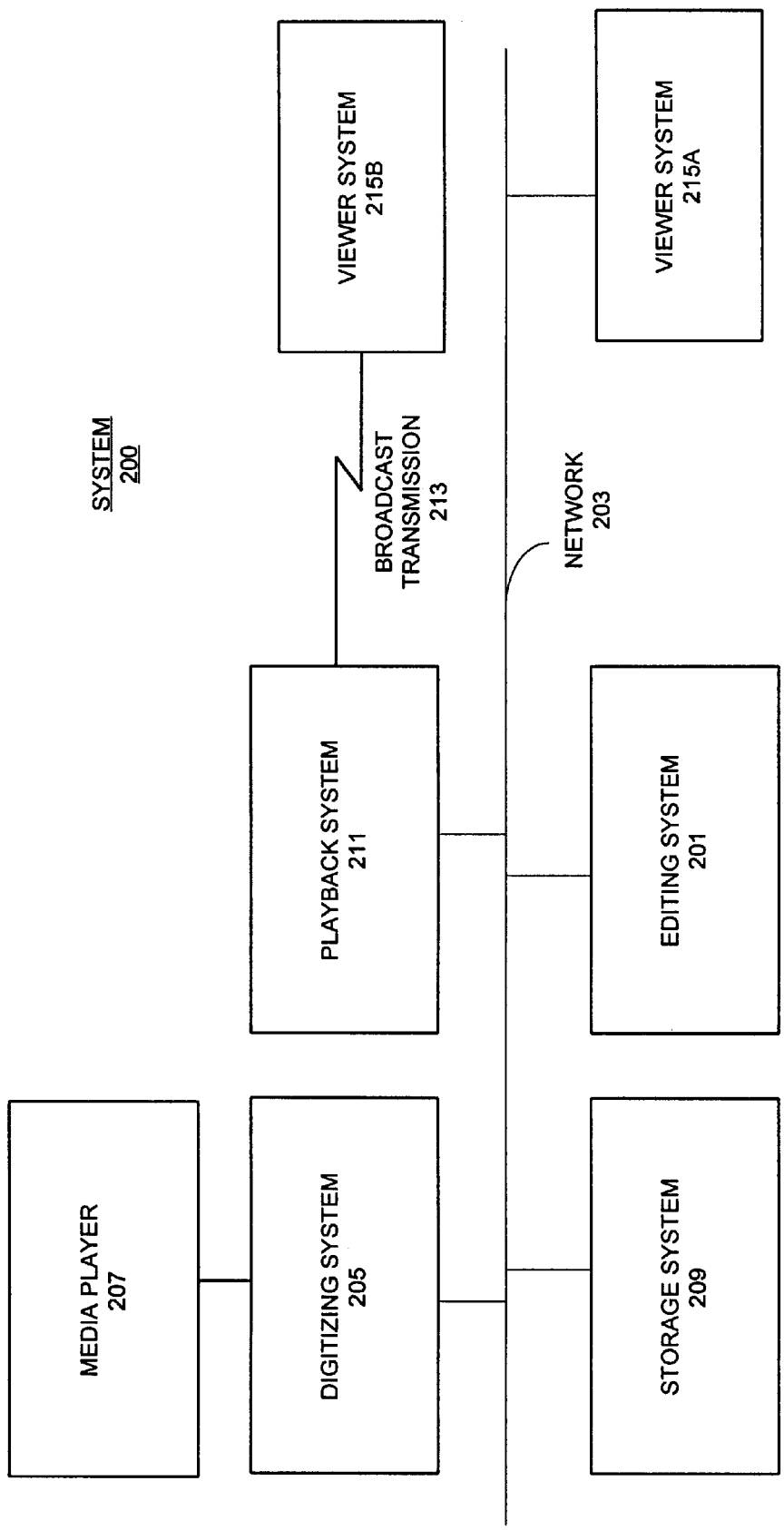
FIG. 2 is a block diagram depicting an editing and delivery system suitable for implementing various embodiments.

FIG. 2 shows one exemplary embodiment of an editing and delivery system 200. The system 200 may include an editing system 201 that may edit video and document presentations for distribution to a number of viewer systems 215. Editing system 201 may use various audio and video media files stored on storage system 209 to create a composition. Editing system 201 may be capable of handling one or more tracks of audio/video information, and may be capable of performing editing functions such as dissolves, wipes, flips, flops, and other functions known in the art of video production. These media files are typically created by a digitizing system 205 that receives one or more audio/video inputs from media player 207. These media files may also be digitized directly by a digital recorder (not shown). Editing system 201 may also use interactive elements in creating a composition.

These interactive elements may take the form of markup language documents having interactive elements that process inputs from a user or other system. Markup language documents may be sorted on storage system 209, or in any other system on any network 103. Network 103 may be, for example, an Ethernet, Fast Ethernet, ATM, or FDDI network, or any other network type known now or in the future. Network 103 may also be a communication bus within a computer or any specially-developed communication hardware. Playback system 211 may distribute these compositions to a number of viewers 215 by transmitting composition data to viewers 215 through network 203, broadcast transmission 213, or any other method for distributing data. Broadcast transmission 213 may be, for example, a transmission of a video signal such as through a cable television broadcast signal, satellite broadcast, or the like. Viewer systems 215A and 215B are consumers, or clients, of the content of the composition. Through these viewers 215, a user or system may interact with the composition and its interactive elements.

It should be understood that one or more parts of system 200 may be implemented on one or more systems. Further, it should be understood that the system may be embodied as a single system having no separable components.

Such an editing system 201 suitable for implementing the present invention is described in one or more U.S. patent applications, including U.S. patent application Ser. No. 08/465,812 filed on Jun. 6, 1995 by Michael J. Wissner entitled METHOD AND APPARATUS FOR REPRESENTING AND EDITING MULTIMEDIA COMPOSITIONS USING REFERENCES TO TRACKS IN THE COMPOSITION TO DEFINE COMPONENTS OF THE COMPOSITION, incorporated by reference. Such an editing system and its interface include U.S. patent application Ser. No. 08/689,577 filed on Aug. 12, 1996 by Phillip R. Moorby et al. entitled MULTIMEDIA VISUAL LANGUAGE METHOD AND APPARATUS, incorporated herein by reference. An example of storage system 209 is described in U.S. Pat. No. 5,267,351, filed on Dec. 22, 1989 by Stephen J. Reber et al. entitled MEDIA STORAGE AND RETRIEVAL SYSTEM, incorporated herein by reference. An example of playback system 211 suitable for implementing the present invention is described in U.S. Pat. No. 5,045,940, filed Dec. 22, 1989 by Eric C. Peters entitled VIDEO/AUDIO TRANSMISSION SYSTEM AND METHOD, incorporated herein by reference. An example of a suitable format for media compositions and elements of a composition includes the Open Media Framework (OMF) Interchange format described in the OMF Interchange Specification, Version 2.1, dated Sep. 18, 1997, incorporated herein by reference. Another suitable media file format may include the Advanced Authoring Format (AAF) developed by a number of companies participating through the Multimedia Task Force (MMTF), incorporated herein by reference.

Further, a commercial editing system 201 suitable for implementing the present invention may be used, such as the Media Composer video production system or NewsCutter news editing system available from Avid Technology, Inc. (NewsCutter is a registered trademark of Avid Technology, Inc.). Also, a commercial playback system 211 suitable for implementing the present invention may be used that implements the Media Engine video playback system available from Avid Technology, Inc. that is incorporated in the Avid AirPlay MP playback server system (AirPlay is a registered trademark of Avid Technology, Inc.). A commercial storage system 209 suitable for storing composition files includes the MediaShare external storage device (MediaShare is a trademark of Avid Technology, Inc.). Other commercial systems may be used.

One or more of these systems may be adapted to associate interactive elements with a composition to create an interactive programming presentation. Interactive programming is a term referring to an enhanced television and video experience that includes the transmission of auxiliary data to display text, graphics and other forms of media concurrently with a conventional television signal. A user may be able to interact with the data in the interactive programming presentation.

Having described systems that may be modified to edit and deliver interactive programming presentations, various embodiments of editing system and playback systems will now be described with reference to FIGS. 3A–3D.

Figure 3A:
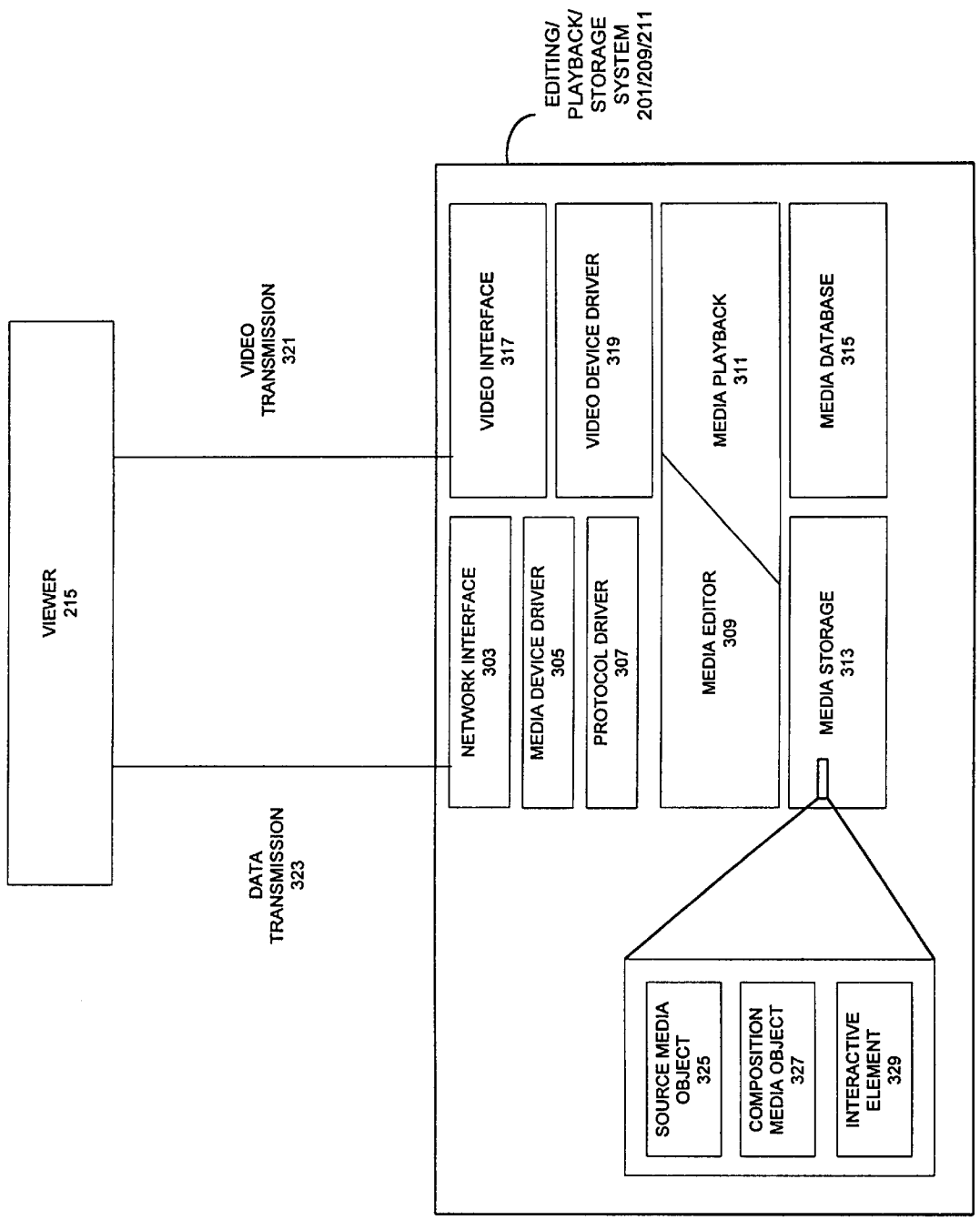
FIG. 3A is a block diagram that shows one embodiment of an editing and delivery system.

FIGS. 3A–3D show various illustrative embodiments of a client-server system used to associate interactive elements with a composition, and a delivery system for an interactive programming presentation. FIG. 3A shows an editing, playback and storage system 201, 209, 211 and its components. It should be understood that one or more of these functions may be distributed or incorporated in the same system, and is shown in FIG. 3A within a single system for simplicity. System 201, 209, 211 includes media storage 313 and media database 315, the latter being used as a locator facility for locating media files within media storage 313. Media editor 309 provides a user interface and facilities for editing a composition of media objects.

The media objects may be, for example, complex objects that refer to media data objects in raw data format and include information relative to the media data objects. These objects will be referred to hereinafter as composition media objects. A composition media object contains information for playing a piece of media represented by a media data object. The composition media object generally includes no actual data; rather, the object includes descriptive information that embodies a media object.

Media objects used in a composition may include source material such as video or audio tape, compact disc, computer generated images, and the like. Currently available digital representations of source material are referred to herein as source media objects. Source media objects contain digital data which correspond to original source material, as well as information regarding how media data objects were created, and an identification of the corresponding source material. Thus, a source media object may contain a source content identifier, identifying the original source material.

A source media object may also include a sample rate in the link of each sample and bytes. The media object also includes an indication of the section of original source material that it represents. The object stores the time offset from the source origin of its first sample. The unit of this offset is the sample duration for the media data file. A media data file may also include fields containing information regarding the content of the media, the quality of the media, or other information. Media objects may assume different formats such as a run-link encoded (RLE) RGBA data format, JPEG format, file interchange format (JFIF) format, or the like. A typical graphics format used to create graphic images overlaid on the video includes RLE pixel array, TIFF, or the like. A suitable format for audio data is the audio interchange file format (AIFF), WAVE audio file format, among others. For text files, such as commentary, file names, and other text associated with other media, a media object may include text in various formats including ASCII or any other character encoding.

To support editing of compositions of such a variety of media, a media editing system 309 is provided that may create data structures for organizing and storing information regarding a composition and perform operations for manipulating these data structures. Media editing system 309 stores various media objects within media storage 313, such as a source media object 325 and composition media object 327. Objects stored within media storage 313 may be generally accessed through a media database 315. Media database 315 contains references to individual objects stored on media storage 313. Media editing system 309 arranges these objects to form compositions that contain references to the source media objects 325. Thus, media editing system 309 manipulates objects that are references to actual data.

Media playback 311 provides a facility for playing back compositions locally at the playback system or may transmit a composition as video transmission 321 and data transmission 323. These transmissions are interpreted by a viewer 215 that is capable of displaying received video signals and interpreting interactive elements. Viewer 215 may be, for example, an Intel-processor based PC running the Microsoft Windows 98 Operating System and having television signal viewing hardware or a standard television having a WebTV hardware device attached. Viewer 215 may also have an additional data connection that would allow the viewer 215 to receive additional information from other sources, such as from the Internet.

Media playback 311 may also transmit interactive elements 329 over a typical data transmission 323 or embedded in another signal, such as a video transmission 321. Media playback 311 generally transmits data using one or more network protocols such as TCP/IP, or the like. Media playback 311 generally sends information to a network interface 303 through a series of drivers such as protocol driver 307 and media device driver 305. Network interface 303 may be, for example, an Ethernet or other network interface, serial connection or modem. Other interfaces may be used. Protocol driver 307 is generally associated with a data link or network layer protocol driver whereas media device 305 is generally a driver associated with a particular network interface 303. Media device drivers and protocol drivers are generally known in the art of computer programming.

Media playback 311 may transmit a composition also in a video format for broadcast to a viewer 215 as a video stream. Video streams may generally be transmitted directly or broadcast through the air, via videotape, a cable, or similar medium. Media playback will generally transmit information to a video interface 317 using a video device driver 319. Video interfaces and video device drivers are well-known in the art of computer programming. Thus, a playback system 211 may transmit a composition over single or multiple data video transmission paths.

FIGS. 3B–3D show various embodiments of a media playback system. In FIG. 3B, playback system 345 transmits both data and video over a video data transmission channel 335. A video and data decoder 337 is provided that may decode signal 335 into a separate data transmission 323 and video transmission 321. These separate transmissions may be then processed by associated hardware or software within viewer 215. In playback system 345, network interface 331 and video interface 333 may be incorporated in a single hardware solution. FIG. 3C shows a playback system 211 that transmits separate data and video transmissions. In addition, a video and data encoder 347 is provided which produces a video and data transmission 335 from a separate data transmission 323 and video transmission 321. The video and data encoder 347 may be, for example, a VBI insertion device for inserting data into one or more lines within the video blanking interval of video transmission 321. FIG. 3D shows an embodiment wherein both viewer and media playback process the video and data transmission 335 directly.

As discussed, TCP/IP information may be transmitted using the vertical blanking interval (VBI) of a television signal. The VBI is a non-viewable portion of the television signal that may be used to provide data services using a variety of protocols. One such use for the VBI includes the transmission of multicast TCP/IP data over point-to-point connections. Multicast methods of distributing data are very useful for the distribution of news feeds, stock quotes, news groups, weather reports, and the like. Generally, multicast communication is useful when sending data to a large group of individual clients because only one copy of data needs to be transmitted by a sender to arrive at multiple clients.

The VBI may be included, for example, within a television signal such as an NTSC television frame. An NTSC television frame comprises two fields having 262.5 horizontal scan lines each. The first 21 lines of each field are not part of the visible picture and are collectively called the vertical blanking interval (VBI). Of these 21 lines, the first 9 are used while repositioning the cathode ray of the television to the top of the screen, but the remaining lines are available for data transport. Line 21 itself is reserved for the transport of closed captioning data. There are therefore eleven (11) possible VBI lines being broadcast 60 times per second (each field 30 times per second), some or all of which may be used for transmitting data. The availability of eleven lines of VBI yields approximately 115 kbps of available bandwidth. It should be understood that one or more of these lines may be used for existing proprietary data or testing services. Thus, transmission of data over the VBI may be just one data service using a subset of these lines.

The amount of available bandwidth for data transmission depends upon the number of lines used within the VBI signal to transmit data. The number of lines used may be adjusted, depending on the amount of bandwidth required.

The North American Basic Teletext Standard (NABTS) is defined in the Electronics Industry Associations Standard EIA-516. This standard provides an industry-accepted method of modulating data onto the VBI of an NTSC signal. Further information concerning the NABTS standard and its implementation may be found in standard EIA-516, incorporated herein by reference.

The NABTS packet is a 36-byte data structure encoded onto one horizontal scan line of an NTSC signal having the following structure: [2-byte clock sync][1-byte sync][3-byte packet group address][1-bye continuity index][1-byte packet structure flags][26-byte data block][2-byte FEC suffix]

The 2-byte clock synchronization and 1-byte byte synchronization, although not part of the NABTS packet, are located at the beginning of every scan line containing an NABTS packet and are used to synchronize the decoding sampling rate and byte timing. The 3-byte packet group address field is Hamming encoded (as specified in EIA-516, and provides four data bits per byte), and thus provides 4096 possible packet group addresses. These addresses are used to distinguish related services originating from the same source, allowing the receiver to determine which packets are related and part of the service. The 1-byte continuity index field is a Hamming encoded byte, which is incremented by one for each packet of a given packet group address. The index number is determined by the packet's order in the forward error correction (FEC) bundle mentioned below. The first packet in the bundle has a count 0, and the two FEC only packets at the end have counts 14 and 15, respectively. This index number allows the decoder to determine if packets have been lost during transmission.

he packet structure field is also a Hamming encoded byte, which contains information about the structure of the remaining portions of the packet. The most significant bit is 0 according to one embodiment. The second significant bit typically specifies whether the data block is full, that is, 0 indicates the data block is full of useful data, 1 indicates some or all of the data is filler data. The least two significant bits are used to indicate the length of the suffix on the data block, in this implementation, either 2 or 28 bytes. This suffix may be used for forward error correction described below.

The data block field may include 0 to 26 bytes of useful data. Filler data may be indicated by a 0x15 following by as many 0xEA as are needed to fill the packet. Sequential data blocks minus filler data form an asynchronous serial stream of data.

These NABTS packets are modulated onto the NTSC signal sequentially and on any combination of lines. Due to the unidirectional nature of VBI data transport, forward error correction (FEC) may be required to insure the integrity of data at the receiver. Any forward error correction could be used for this purpose. The FEC for NABTS is capable of correcting single byte errors and single and double byte erasures in a data block and suffix of an NABTS packet. Further information concerning the packet format and transmission of multicast TCP/IP information over the VBI is disclosed in Proposal-Vertical Blanking Interval (VBI) Standard to ink TV Networks to the Internet, an Internet Draft Proposal submitted to the Internet Engineering Task Force (IETF) and incorporated herein by reference.

A number of VBI encoder and decoder products are commercially available for the purposes described herein. Several devices for encoding information into a television signal include the TES3 and GES3 VBI encoder and /decoder units available from the Norpack Corporation. A WebTV hardware device may also be used as a decoder device. Other encoder and decoder solutions may be used to decode transmitted VBI data. It is understood that other methods for transmitting data and video may be used.

Creating Compositions

The basic building blocks of a composition are called components. The composition is structured as a tree of components; it has a root component and a component may or may not have some subcomponents, depending on its type. A component is a function over time because it contains information for producing a state of its portion of the composition at any time within its range. A component thus represents a time-dependent sequence of media data objects or sources called a media stream.

The simplest elements of a composition are source components or "clips" representing sections of actual media such as video on a videotape, audio on a compact disk, computer-generated image on a computer disk, or the like. Other components represent different combinations of media streams which produce new media streams. Such components represent the variety of relationships created by editing operations performed, for example, by video editing systems and audio mixers.

Components may be categorized and implemented in several different ways. It may be preferable to use a form of object-oriented programming to enforce categorization. The above-described computer system may be programmed using an object-oriented programming language, such as C++, to provide definitions of types of components. Through object-oriented programming, components may inherit common functions between component types and may enable enforcement of structural rules for a composition.

In an object-oriented composition editing and representation system, there may be two types of hierarchies. The first type of hierarchy is abstract, illustrating how one component type may be a subtype of another component type. Such a hierarchy is known as a class hierarchy and will be described below in further detail in connection with FIG. 4. A second type of hierarchy is a structural hierarchy, that indicates how a composition is composed hierarchically of instances of abstract components. A structural hierarchy of a composition will be described in further detail with reference to FIG. 5.

Figure 4:
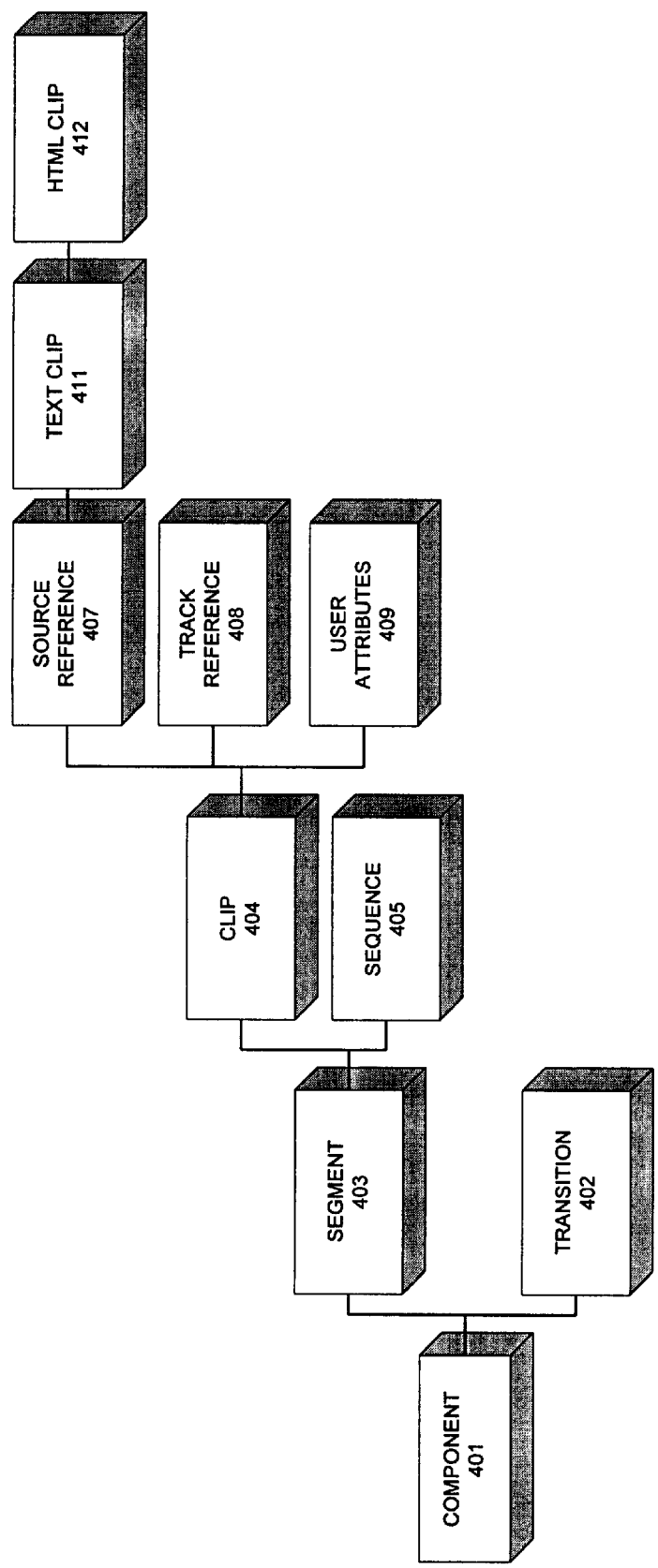
FIG. 4 is an object-oriented diagram showing a class hierarchy of object classes of objects that may be created in an editing system.

Data structures used for representing a composition generally exclude media data, by containing indications of or references to the actual media data and representations of the relationships between the media that form the composition. Thus, positions are stored separately from the actual media data to which they refer, allowing many compositions to use the same media data without duplicating it. With such a structure, a composition need not be reproduced when it is changed. Further, the composition itself may not actually reproduce the presentation but merely represents it and provides reference information for the playback of the presentation. As shown in FIG. 4, there may be several classes of components in a composition.

A class is a category of object such that all objects within that class are similar in representation and functionality. These classes may be implemented in a computer system using an object-oriented program construct referred to in the art as a class. Some of these classes are abstract classes, of which no components are direct members. Components may, however be indirect members of an abstract class by virtue of being direct members of a subclass of the abstract class. Because there are no direct members of an abstract class, the purpose of defining an abstract is to express the commonality of the subclasses of that class. It enables operations to be defined once for the abstract class rather than multiple times, once for each subclass. Classes that are not abstract, and therefore which may have direct members, are called concrete classes.

Specific classes will now be described in connection with FIG. 4. It should be understood that other classes may be implemented, and the invention is not limited to the specific classes shown.

The top level, abstract, class of a composition is referred to as a component 401, and defines functionality common to all components. For each component created for a composition, memory locations are allocated to store and group together relevant information concerning that component. A component that is a member of a subclass of a component class inherits characteristics of the component class. Information stored as part of each component to be described in more detail below includes:
1) Track Type
2) Player Function Code
3) Edit Rate
4) Parent
5) Subcomponent Identifier
6) Edit Nesting Level
7) Precompute
8) Name
9) Attribute List Track type (1) provides an indication of the type of material, or media data, represented by the component, such as video, audio, etc. Player function code (2) indicates an algorithm for displaying material represented by the component.

A component may also include edit rate (3) that is a representation of time units used for determining the duration of the component. The edit rate differs from the actual sample durations stored in the media data, and may be thought of as a "virtual" sample rate. An edit rate is a number of edit units per second and is not limited to being an integer. For example, the edit rate could be a floating point decimal. The edit rate thus defines duration of virtual samples within a component, and determines the smallest editable unit of media. For example, a frame-based 30 frame per second NTSC video editing system may use an edit unit of 29.97 for its video components. An audio editing system for editing audio associated with the video may use the same edit rate of 29.97. Thus, media data may be substituted at a later time with media digitized at a different sample rate, and the composition may still be valid because enough information is maintained to perform a sample rate conversion. Sample rate conversion capabilities are well-known in the art.

A component may also contain a reference to a component which depends from it within the composition, this reference will be referred to as a parent pointer (4). The component may also contain a subcomponent identifier (5) that identifies a component in its parents context. Because a composition is hierarchical. every component, except the root component, has a parent component. By maintaining parent pointers it is possible, when a composition is edited, to find dependencies on a particular component, enabling a composition manager, for example, to readily locate components affected by a change to the composition.

A component may also contain an optional pointer (7), another component representing a precomputed media data file. A precomputed media data file is one that contains a concrete representation of an intermediate media stream produced by the component it is attached to. This feature enables an application to play a composition in real-time, when it would not be possible to compute in real time the media effects represented by the composition. Further, the feature enables an editing system to see the precomputed result, or to remake an effect from original source material.

The edit nesting level (6) may be used for identifying nested editing steps for editing a component. Its use will be described in more detail below in connection with the description of editing operations.

Name (8) and attribute list (9) of a component are examples of optional information for identifying contents of a component.

A component need not maintain any explicit indication of its location in time within a composition. This location may be determined by following parent pointer links to the root of the composition, and, at each level, passing subcomponent identifiers to the parent. The parent then computes the offset of the subcomponent within its own context and adds it to an accumulating offset. By not storing this information explicitly, the number of components which are required to be examined during an edit may be limited. Thus, high efficiency during editing is maintained.

Segment 403 and transition 402 are two subclasses of component class 401, thus these two subclasses inherit data and structure defined in component 401.

A segment is an abstract class of component 401 that represents an independent description of a section of a presentation. A segment is independent because it provides a meaningful representation of a portion of a composition even when viewed out of context of the rest of the composition. A segment may be a simple clip representing some kind of media, or it may be a more complex structure such as a sequence, or a track group defined in more detail below. A segment is also a representation for a track and inherits functionality from component 401. There are three subclasses of the segment class 403: clip 404, sequence 405 and track group 406.

A sequence, a concrete subclass of a segment, represents serialization or Concatenation in time of other subcomponents. The sequence, as its name implies, is an ordered list of segments separated by transitions, with the restriction that it begins and ends with a segment. This restriction allows sequences to be treated as segments, which may be included in other sequences.

The order of segments in a sequence defines the order of interpretation or "playback" thus, sequencing information is represented implicitedly by the structure of the sequence, rather than explicitly through the use of relative start times and durations for clips. The sequence may include the following information:

1) Ordered collection of subcomponents
   A) Length of subcomponent in edit units
   B) Subcomponent identifier (pointer)

A sequence of media data may be represented in the form of a tree of its subcomponents rather than linearly. A modification of a balanced binary tree data structure (a modified 2–3-tree) may be used to store subcomponents.

A clip 404 is an abstract class of component 401 that represents a single contiguous section of a piece of media, with a specified position in the media and a specified length. A clip may further contain information on its length, that explicitly determines its duration. The position of a clip in the source media may be explicit or implicit, depending on its subclass. There are three concrete subclasses of clips: Source references 407, track references 408, and user attributes 409.

Compositions may represent arbitrarily complex manipulations of media, but ultimately the compositions are based on physical sources, such as a video tape from a camera or graphics produced by a computer program. References to source material are embodied in source clips 407 that describe single time-contiguous sections of a source, by noting a position in the source media, and a length. A source reference 407 does not contain actual media but only references it. Source references 407 may represent the lowest level, or leaf components, of a composition. A source reference 407 inherits properties and functions of a clip, but also contains the following information:

1) Physical Rate
2) Physical Start
3) Physical Length
4) Source Identifier
5) Source Offset
6) Currently Linked Media File Source identifier (4) identifies a specific portion of an original source. The source offset (5) identifies a starting position within the source. The selected media digitization of that source or the currently linked media data file (6) is represented, for example, by a pointer or file name.

To be independent of data type and data sample rate, source references such as the source offset are measured in abstract units called edit units (EU). An EU is a unit of duration, representing the smallest interval of time that is recognized by a given part of a composition, and the number of EU's per second is called an edit rate. An editor may choose the edit rate for a particular component to represent something useful in the application domain. For example, an application that edits audio based on video frame boundaries would most likely choose an edit rate of 29.97 for the audio tracks, whereas an application that creates audio for use on compact disks would most likely use an edit rate of 44100. Another way of thinking of edit rate is a "virtual" sample rate. This virtual sample rate may or may not match the actual sample rate of the digital media.

The length of a source clip is measured in edit units and the target position in the source is denoted in edit units from a point on the source called the source origin. The origin is an arbitrary place in the source which serves as a reference point for measurements. Additional information concerning source clips is described in U.S. patent application Ser. No. 08/465,812 filed on Jun. 6, 1995 by Michael J. Wissnor entitled METHOD AND APPARATUS FOR REPRESENTING AND EDITING MULTIMEDIA COMPOSITIONS USING REFERENCES TO TRACKS IN THE COMPOSITION TO DEFINE COMPONENTS OF THE COMPOSITION, incorporated by reference.

A source reference 407 may include a text clip object 411 that may be used to represent textbased media. By specifying such source references as text clip objects, special editing behaviors may be applied to those sources. For example, text-based objects may be edited in a text-based editing system or other editing system capable of revising text.

Interactive elements such as markup language elements may be represented by a new class of text clip 411 referred to as an HTML clip 412. It should be understood that other markup languages may be represented by and HTML clip or may have their own concrete object class that inherits from text clip 411. An editing system 309 may associate HTML clips with particular editing functions specific to markup languages. For example, a broadcast of a television show may display a particular actor, and an interactive element that provides a link to the actor's fan club information may be displayed simultaneously on a viewer's screen. A user may activate this link using an appropriate input device such as a mouse, thus displaying the corresponding fan club information. Thus, the appearance or disappearance of a particular interactive object may be linked to a particular segment of the composition.

A track reference 408 is a concrete subclass of a clip. The track reference 408 represents a contiguous section of media extracted from another track within the same composition. A target offset into the referenced track may be computed relative to the position of the track reference 408 component within the composition. The specific track references by a track reference 408 may be defined by a track number and a scope number.

The scope number identifies a particular enclosing scope (as defined by the track group components), relative to the track reference 408 itself. A specific scope is found by travelling up the composition structure towards the root object using the parent and subcomponent identifier links, and counting each scope encountered. When the scopes equal the scope number, the reference scope has been located.

The track number identifies a specific track within that scope according to the subcomponent list of the track group.

Other implementations may identify scopes differently, for example, by searching for a specific labeled scope, labeled with a number of string. Other implementations may also identify tracks differently; for example, by searching for a specific label, or by using a relative track number, which is added to the referencing tracks own track number within the scope.

As will be described below, a track group defines a scope, and defines tracks, and a track reference 408 identifies a referenced track by identifying a scope and a track within the scope. The track reference 408 object creates a kind of relative link, which has a very useful property: an assembly of components containing track reference 408 may be copied or removed from an enclosing component, and then reinserted somewhere else, and still by definition refer to a track in the new context. This feature provides the ability to interchange parts of compositions with ease.

Although effects may be built out of wholly contained subtracks of information, it is frequently useful to create an effect which references a separate parallel track in a composition. One example might be an audio track which contains an effect which is the echo of another audio track. A track reference 408 may be used in the effect instead of an explicit subtrack, to make the effect on the first track refer to the second track. A track reference 408 may be also used more generally for implementing layered effects in a composition. Cut and paste of effects is possible: a portion of a composition may be extracted and inserted at a different place in the composition or in a completely different composition, while retaining the internal structural relationships of the contained elements.

An arbitrary user-defined property which varies over time may also be represented as a segment in a composition. Certain user-defined properties may vary in time, in a manner similar to a media source such as video. A track may be added to a composition such that it represents such a property, and user attribute components can be added to that track, each representing a different value for that attribute.

Transitions 402 may be extended to work with attributes. A camera zooming in from a long shot to a close up could be represented by a transition called an Attribute dissolve placed between a long shot clip and a close up clip.

Figure 5:
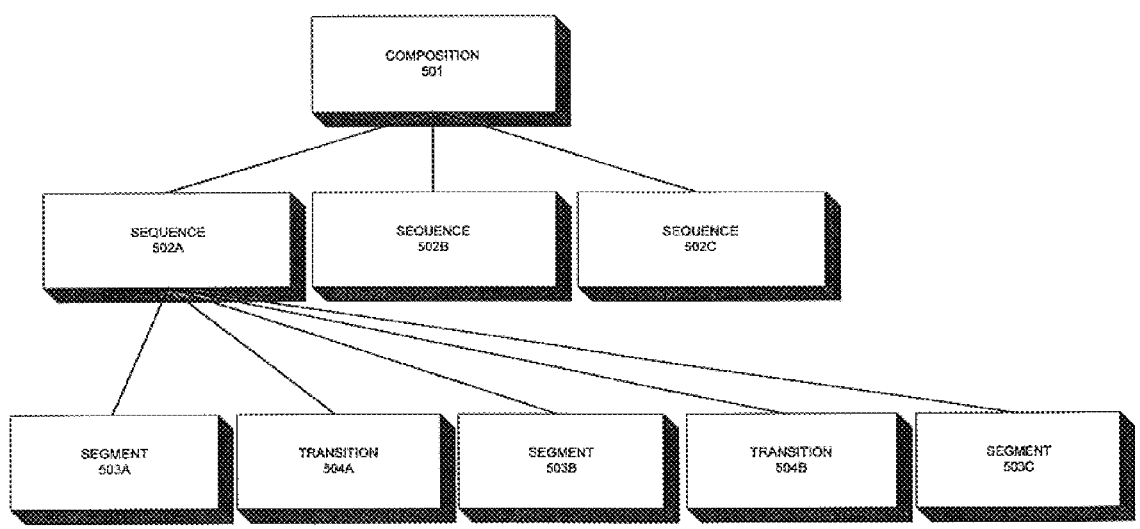
FIG. 5 is a diagram illustrating a hierarchy of a composition.

FIG. 5 shows a typical organization of objects in a composition. A composition object 501 is the root object from which other objects are referenced. The composition object 501 may include a sequence object 502 that may include one or more segments 503 and transitions 505 as described above. A composition created using these objects may have an arbitrarily deep hierarchical structure. A composition 501 is a track group having one or more tracks. In this example, there are three. Each track is represented as a sequence 502 in FIG. 5. A sequence 502A includes a number of segments and transitions 503 and 504. Each segment 503 in this sequence may also include any number of components, such as another track group, another sequence, or simply a source clip. It should now be readily apparent that such a combination represents many different possible types of layering of media in a composition.

A user may define an Interactive Programming track that includes one or more interactive elements. The interactive programming track may be a subclass of the track class. This interactive track may define the transmission times and display time for each of the interactive elements. A playback system may communicate to a viewer system using events, such as sending a trigger to the viewer to display an interactive element or remove the element, among other actions. These events may, for example, cause the media playback system 311 to transmit a multicast datagram including trigger event information. Such information may include, for example, a command or type of event and information identifying the interactive element. Some of these events may be interpreted by the playback system 311 itself. For example, a transmit event may cause playback system 311 to transmit an interactive element to the viewer.

Editing functions regarding track references and other data elements described herein are described in U.S. patent application Ser. No. 08/465,812 filed on Jun. 6, 1995 by Michael J. Wissner entitled METHOD AND APPARATUS FOR REPRESENTING AND EDITING MULTIMEDIA COMPOSITIONS USING REFERENCES TO TRACKS IN THE COMPOSITION TO DEFINE COMPONENTS OF THE COMPOSITION.

It should be understood that the data structures described herein are but one method of implmenting interactive elements. Media data file formats such as the Open Media Framework (OMF) Interchange format and the Advanced Authoring Format (AAF) and their data structures may be used or modified to incorporate the concepts described herein.

Interactive Programming Track Parameters

Figure 6A:
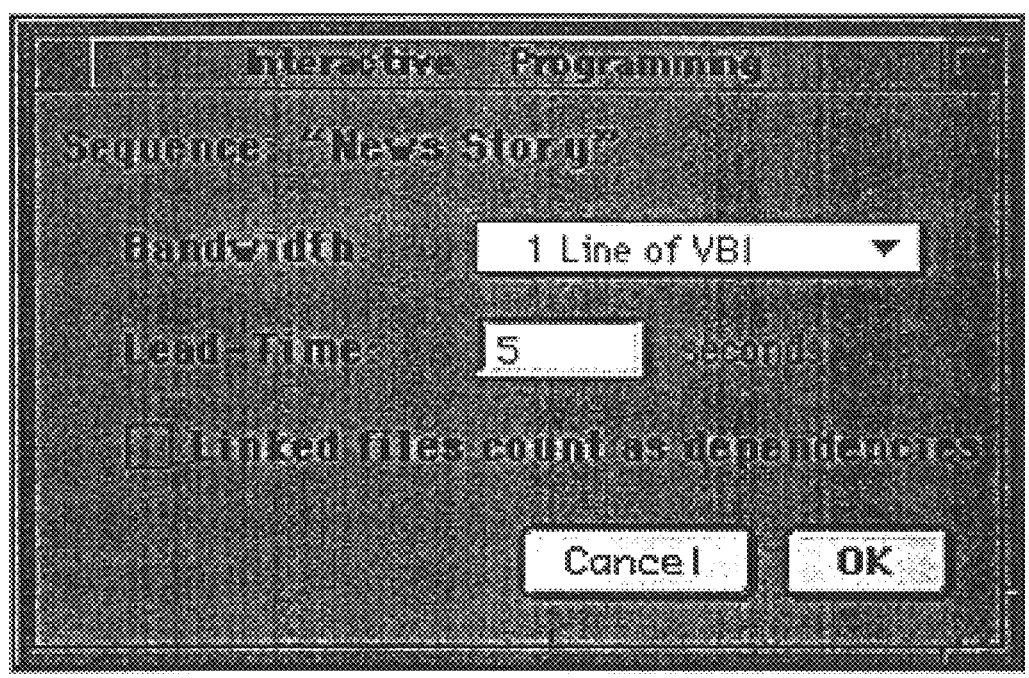
FIG. 6A is an example display of an interactive interface that controls an interactive programming track.

FIG. 6A shows an example display view of an interface that controls an interactive programming track. The media editing system 309 may display a dialog box that allows an editor of an interactive multimedia presentation to specify settings appropriate to the Interactive Programming track in a particular MediaComposer sequence. This dialog box may appear if the user has added an Interactive track to the sequence in the timeline. The dialog may allow the editor to specify:

The bandwidth to be used for the Interactive Programming track. When used in conjunction with a VBI insertion device., this value may be specified in terms of the number of lines of VBI which will be devoted to the data stream. This value can determine how long each interactive element will take to download and will be used in calculating whether or not a given sequence of elements in the timeline will fit within the time constraints. For example, for an interactive element that is 55 Kbytes in size that is required to be transmitted within 0.5 seconds, 11 lines of the VBI would be required because 11 lines of VBI corresponds to approximately 110 kbps data transmission rate. Allowances for overhead and error correction may be included in determining of required bandwidth.

The lead-time to use for interactive elements in the given composition. The value of lead-time may specify how long (in seconds) a particular element is transferred to a viewer before it may be referenced by an event such as a trigger. For example, the editor might want to provide a five-second window to ensure that the necessary interactive elements will be available on the target computer before displaying a main interactive element such as a main HTML file. Alternatively, the media editing system may explicitly determine an amount of transmission time required to download all required elements, such as dependent interactive elements, to the viewer before sending a trigger event.

Whether to download dependencies. The download dependencies option may determine whether or not files referenced by a given interactive element such as by links (e.g., via the HREF keyword of HTML) are considered to be dependencies of the referring element and thus the dependant elements are automatically downloaded with the referring element. If this option is disabled, only elements explicitly referenced by the main element (such as GIF image files referenced with the IMG keyword of HTML) are downloaded.

Media editing system 309 includes various graphical interfaces that provide an easy-to-use interface for a user to create compositions. Such an interface system may include a system such as the one described in U.S. application Ser. No. 08/689,577 filed on Aug. 12, 1996 by Phillip R. Moorby et al. Entitled MULTIMEDIA VISUAL LANGUAGE METHOD AND APPARATUS. In such a graphical user interface, an icon or other similar symbol may represent a given amount of information or object which may be video data, textual data or audio data or a particular file or instruction. This icon representation may be moved about on the screen by a user and interconnected or linked with other icons to form a multimedia story.

Thus, without having to actually manipulate sound or video materials, the graphical user interface provides a representation of each of those pieces of information which may be manipulated by the user in a fashion he or she desires on the screen, using a mouse or another cursor pointing device.

Once the user has linked the various materials or objects in the desired format, the information may be retrieved in the order established by the user or, in the case of a multimedia presentation, the multimedia presentation's "story" can be "played." This graphical user interface has the advantage that even an unsophisticated user may author somewhat complex presentations without knowing much about computers by simply taking a icon, symbol or other representation of a particular type and given amount of data and manipulating that image on the user's computer screen. The underlying program possesses the intelligence to react to the movement of the representation or symbol on the user's computer screen and manipulate the underlying data which the symbol represents on the user's computer screen. The data structure underlying the operation of the present invention may be a series of conventional data structure links well known to those skilled in the art which link various pieces of multimedia material.

Thus, from the user's point of view, the movement and interaction of data may be accomplished simply by connecting and interacting icons on the user's screen. The media editing system 309 provides for the capture of a certain amount and type of data as designed by the user or another, such as a video clip or music, and the association of that particular data set with a particular icon representation or symbol.

Media editing system 309 may include a number of graphical components for composing the structure of a story. One is called a timeline. In a timeline, icons representing the story's contents are scaled to depict the length of the presentation of the material for that icon and are placed in proximity to other icons to show timing, synchronization and composition relationships between icons.

A timeline is a simple, time-ordered collection sequences of icons or objects. When a sequence of objects is played, each of the objects is played in order, left to right, top to bottom if there is more than one row of icons. It is to be understood that references to a timeline or sequence means the graphical representation of a series of events which together make up a multimedia presentation.

Figure 6C:
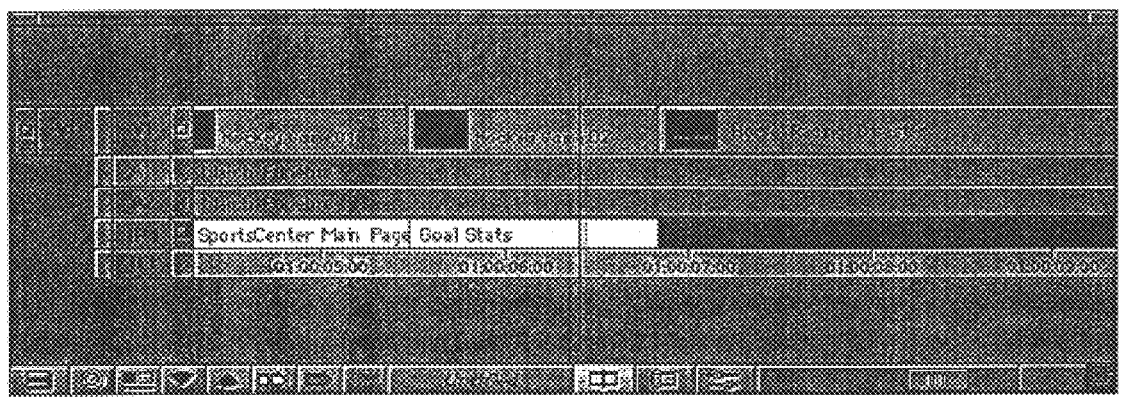

Most presentations contain graphics, video, and audio material, that may be placed along a timeline. Icons or objects representing this material may be "placed" on the timeline by selecting the object and moving the object to an appropriate point on the timeline. This placing procedure is commonly referred to in the art as "drag-and-drop." In a timeline, icons (such as icons that represent media perform action, and link with other icons) are placed along the timeline to represent the contents (such as graphics, video, and audio, etc.) of the presentation. Because the computer can store information in many ways, icons can store presentation content by utilizing many different kinds of computer-based file formats. Data may be stored in a file during editing and playing. In addition, if desired, data may be stored in an external storage medium or computer. A timeline, once completed or partially completed, may be played using the media editing system 309. The position of the icons along the timeline determine the sequence by which the presentation is played back to the viewer. An example of a timeline is shown in FIG. 6C.

Importing Elements into Bins

Modifying a conventional media editing system 309 editing system to handle interactive elements offers many advantages. FIG. 6B shows a media composer 309 display view showing a media editing system "bin" that lists available interactive elements that may be included in a composition. The ability to import Interactive Programming elements such as HTML and other file types into standard media editing system bins allows the editing system to operate on them in much the same way as other media elements (organizationally, etc.). To perform the import, a user may select the bin and choose an "import" command from the appropriate menu. The file type of Interactive Programming is chosen and the dialog box displays all applicable element files. The user then may select one or more files and select an appropriate button to perform the import of the interactive element files. The editing system 309 then may list the interactive elements along with the files that contain them.

When an Interactive Programming element is imported into a media editing system bin, the element file is scanned to see what other element files, if any, are referenced by it (for example, if there are image files referenced by the main HTML file). These element files may be automatically imported together with the main file. When the user specifies that a particular HTML file is to be used in the sequence, these files may be included implicitly as well. Just as with other media elements in the bin, the user can select an Interactive Programming element to obtain information about it through the media editing system 309 interface. This information may include the location of the original file. If the user edits the original file, he or she may re-import the file in order to update the copy within the media editing system bin.

Interactive Programming Track in Timeline

When the user chooses the "New Interactive Programming Track" command in the Clip menu, an Interactive Programming track is added to the sequence currently displayed in the Timeline window. FIG. 6C shows a media editing system 309 display view including an Interactive Programming Track IP1. This interactive programming track allows the placement of Interactive Programming elements and events into the sequence being edited, through the drag-and-drop metaphor described above with respect to the graphical user interface of the media editing system 309.

Element Appearance in Timeline

Interactive Programming elements appear in the timeline in much the same way as other media elements such as video elements. The position and size of the object in the timeline reflect the time during which the object will appear on the target viewer's display. For example, referring to FIG. 6C, an interactive object "SportsCenter Main Page" begins at approximately time 01:00:05:00, and thus will appear at that time on the viewer's display. Also, the same interactive object ends at approximately 01:00:05:50, and thus the object will cease to be displayed at that time. Note that the interactive object "SportsCenter Main Page" begins at the same point in the timeline as the "Hockey Game 01" video element in the video track VI. Thus, the "SportsCenter Main Page" and "Hockey Game 01" elents are associated with each other through the timeline, and may be displayed at the same time. As described below, although the interactive element "SportsCenter Main Page" is displayed at the same time as the "Hockey Game 01" video element, the interactive element may need to be transmitted by the playback system at an earlier time than the transmission of the video element.

Enhancement Events in Timeline

Other than Interactive Programming elements themselves (such as HTML and GIF files), the user will add events to the timeline. Some events, such as triggers to display a given HTML element on the target machine are generated implicitly by adding the element to the timeline. For example, in the case of displaying the "SportsCenter Main Page" object shown in FIG. 6C, media editing system 309 may indicate that a display event should be transmitted to a viewer at the 01:00:04:00 time in the timeline. Similarly, an "end display" event may be sent to remove the "SportsCenter Main Page" object at time 01:00:05:50. Other events, such as File Transfers, Ticker Data, Chat Data, Messages, and custom events may be added to display different types of interactive elements.

Workflow

The following description demonstrates how an editor would add interactive objects to an already edited sequence within the media editing system 309. The edition of the interactive object track may occur in parallel with the edition of the video and audio tracks. This description, however, describes sequential editing to more clearly illustrate the workflow issues brought into play by the addition of the Interactive Programming features. It is understood that the editor may use different editing sequences to achieve a same result.

Interactive Content Creation

The creation and editing of the interactive elements in a composition may be prepared in advance of their inclusion in the timeline sequence by using an appropriate tool such as Microsoft's FrontPage HTML editing system application (FrontPage is a registered trademark of the Microsoft Corporation). These files may be created on a system on which the media editing system 309 resides, have been copied to the media editing system 309, or reside in a location accessible to the media editor 309 system over the network, such as on an Internet server. Media editing system 309 may be modified to edit these interactive elements directly.

Importing Interactive Programming Elements

To work with the Interactive Programming elements, the editing system may import them into a bin within the target project. Importing is accomplished in the same way as any other import, except that the user is now prompted to locate the interactive element files. When importing the files, media editing system 309 may maintain a link to the original files on the user's hard drive (or networked drive) or other appropriate storage area. If the files change at any point in the future, the user may be notified and may have the option of updating the version stored in the bin. The editor may use the bins in his or her project to organize Interactive Programming elements in a conventional way as is done with audio and video elements. Double-clicking the object in the bin opens the element in an HTML or other editing system as appropriate. The editing system may be defined by the user's settings.

When importing an HTML file, the media editing system 309 may automatically import any referenced files as appropriate. These referenced files can appear as reference clips within the bin (similarly to the appearance of objects referenced by a sequence, but not explicitly added to the bin themselves). Depending on the user's preferences, files referenced through links in the imported HTML file may or may not be included as reference clips.

The Timeline's Interactive Programming Track

Once the desired clips are available in the bin, the user can use a menu command to add an Interactive Programming track to the timeline containing the sequence he or she is editing. The user, through the editing system interface will be able to drag previously imported elements into the track or may open them in the source monitor and then splice or overwrite them into the timeline.

Adding Interactive Elements to the Timeline

After the principal interactive element is in place, a user may operate the editing system to add whatever other elements are appropriate at the proper points in the timeline. Interactive Programming elements placed into the timeline appear similar to the way other media elements do. They have a length which indicates the duration for which they will be displayed on the user's screen. The editor may operate with the interactive element data in the same way as he or she would use any other media in the timeline. The editor may be alerted if there is not enough time before an interactive element is to be shown for it to be downloaded. If there is not enough time, the user can either move the interactive element further down the timeline or remove non-critical elements ahead of the element in the timeline.

Inserting Interactive Programming Events

These trigger events may be generated automatically by inserting an element into the timeline. Other types of events may be inserted using standard video effects within the media editing system 309 to provide things such as messages, file transfers, etc.

Previewing

A user may preview the interactive elements within an interface of the media editing system 309. When the timeline sequence is played in the media editing system 309, the Interactive Programming track can be played as well, resulting in output to a VBI insertion device. The editor may preview the output video presentation using a WebTV box connected to a standard television monitor or using a second PC with the appropriate hardware running Windows 98's TV viewer. Other systems may be used to preview the presentation.

Output

Output of Interactive Programming track is output in a manner similar to other media output. The user chooses a digital cut command and editing system 309 may output the data directly to a medium such as videotape. As the sequence is being played, the Interactive Programming elements may be simultaneously output via a serial or other type connection to the VBI encoder. As discussed above, the VBI encoder takes the video output from the media editing system 309 and inserts the enhancement information into it, producing an enhanced video stream. The enhancement information may include markup language elements. This information can be stored on standard videotape, stored in some digital media format, or broadcast directly from the media editing system 309.

Example Edit

Figure 7:
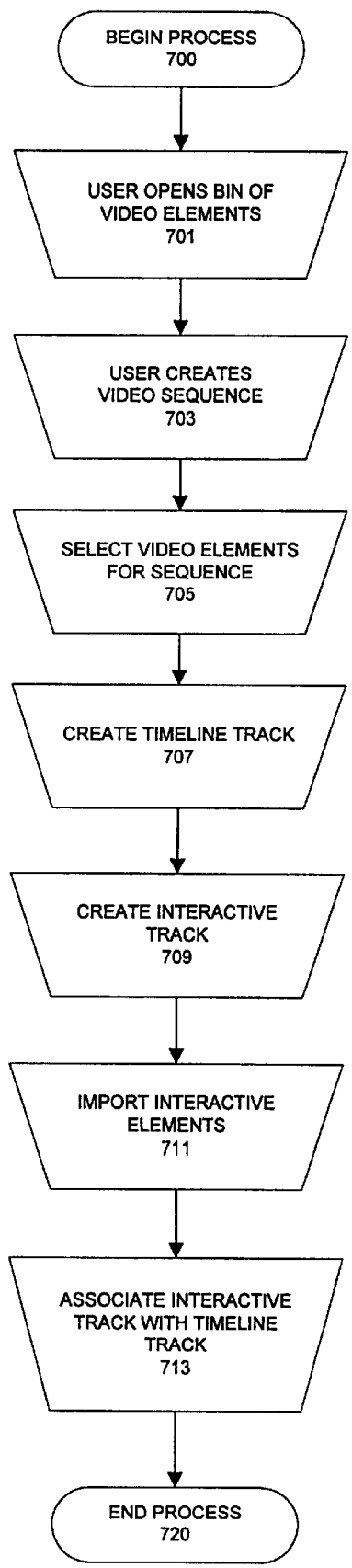
FIG. 7 is a flow chart showing a method of processing an interactive element in an editing system.

FIG. 7 describes a process for creating a composition including interactive elements. A user, through the media editing system 309, opens a bin of video elements at step 701. At step 703, the user creates a short sequence using pre-defined edit points. At step 705, the user positions the cursor on different shots in the sequence. For example, the user would like to associate information regarding the star who is currently displayed during the short sequence. Another example could include placing a link to a downloadable file including the script from the video. Many other associations between interactive elements and the video presentation are possible.

At step 707, the user positions the cursor over one shot and marks the clip. This marks the entire range (duration) of the shot and creates a new timeline track. At step 709, the user invokes the interactive Programming track. This track is used to facilitate the encoding of embedded information for Interactive Programming of interactive elements. At step 711, the user creates an Interactive Elements bin and imports the Interactive Programming elements that will be used within the composition. At step 713, the user patches the Interactive Programming characteristic (track) of the source element to the Interactive Programming, track in a well-known manner. The user may continue to mark clips further in the timeline, call up new interactive elements, and overwrite them into position. The user may open the Interactive Programming, Parameters dialog box to adjust bandwidth, lead-time, and dependencies for the transmission of the interactive elements. As discussed above, the Interactive Programming parameters will encode and transmit the interactive elements in real time through the VBI the information that has just been added to the sequence via the Interactive Programming track in the timeline. The user may play back the composition and watches the encoded results on a viewer such as a WebTV-based viewer. The user may further add interactive elements to the composition and review the composition in a recursive manner. It should be understood that many other editing sequences are possible, and that this is merely one example of an editing process.

Determining Bandwidth Requirements

Figure 8:
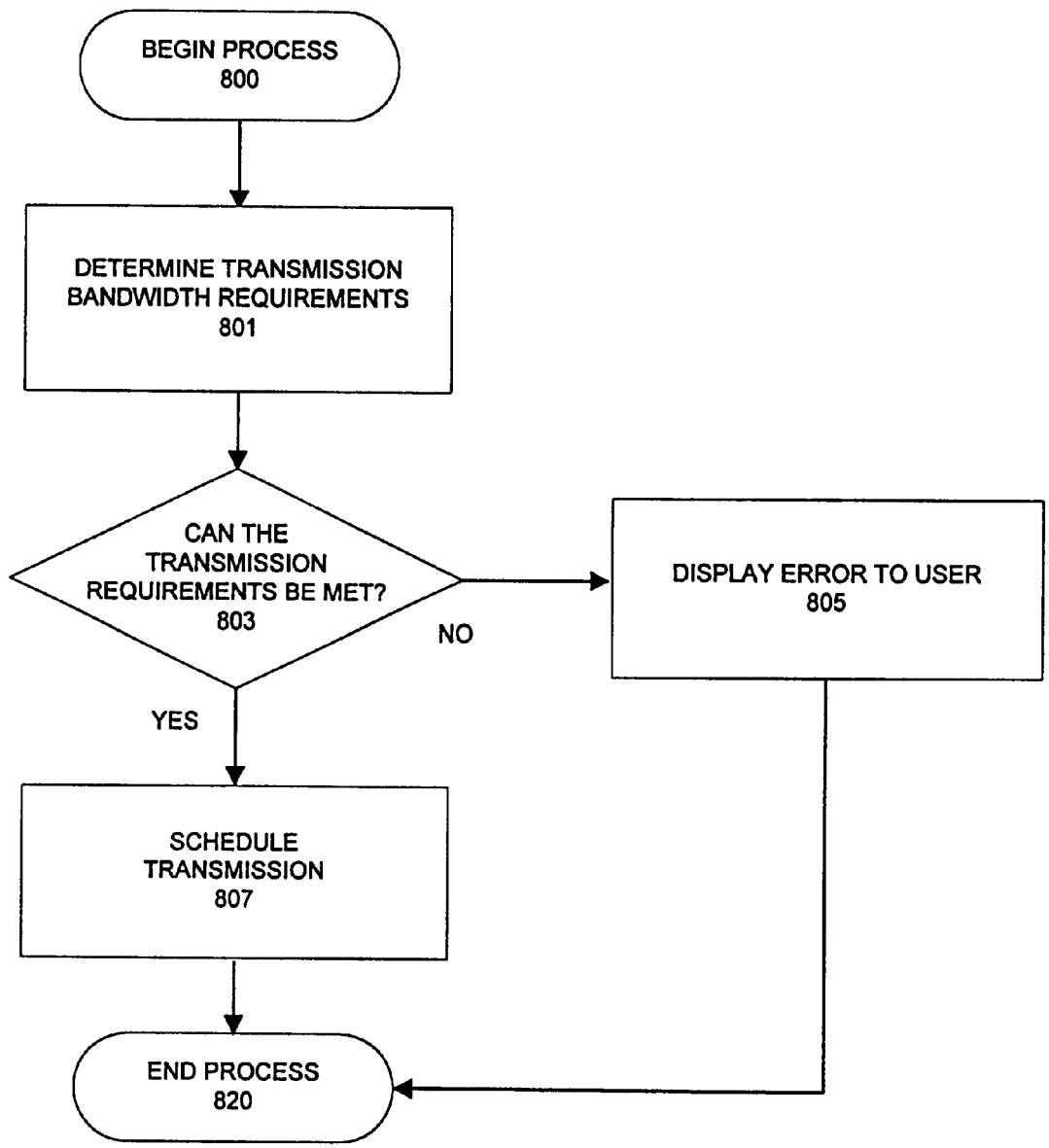
FIG. 8 is a flow chart showing a process for determining bandwidth requirements.

FIG. 8 describes a process for determining transmission bandwidth requirement for transmitting an interactive element. At step 801, editing system 309 determines the transmission requirements for transmitting the interactive element. At step 803, editing system 309 determines whether requirements can be met by the current data transmission channel. If the data transmission is a VBI channel, the amount of transmission bandwidth will depend on the amount of lines of VBI used to transmit the interactive element. If these bandwidth transmission requirements cannot be met, the editing system 309 may indicate an error to the user at step 805. If the bandwidth requirements can be met, editing system 309 schedules a time for transmission of the interactive elements at step 807. The editing system 309 may develop a transmit event associated with the transmission of the element. This transmit event may be interpreted by the media playback system 311 as a signal to being transmission of the interactive element. At step 820, the determination process ends.

Associating Interactive Elements with Video Track Elements

Figure 9:
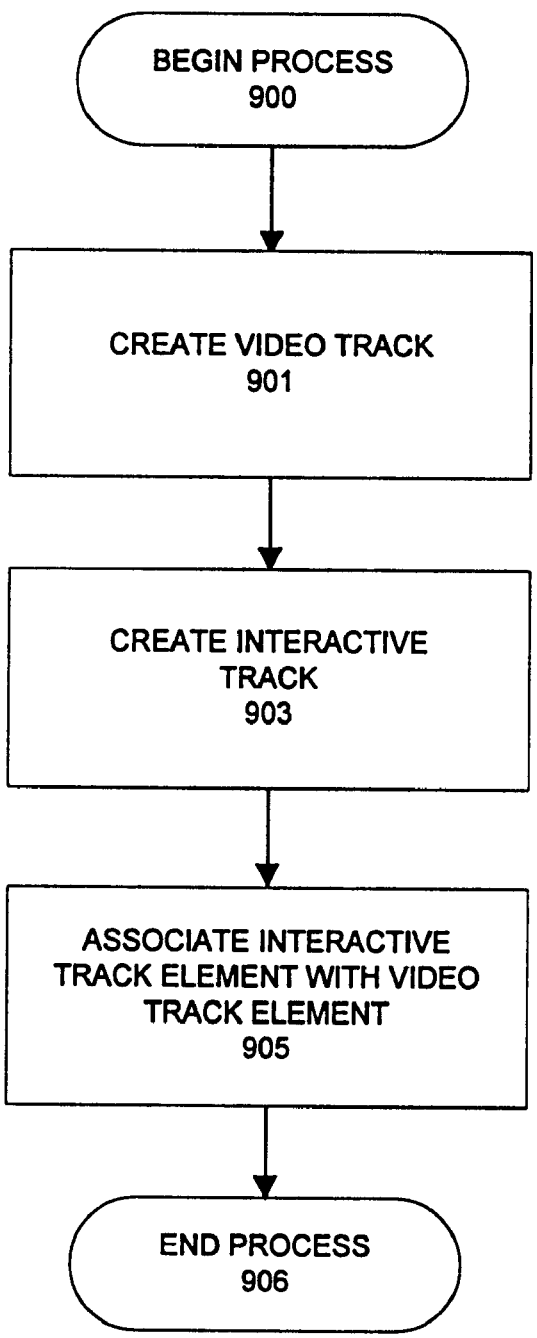
FIG. 9 is a flow chart showing a process of associating elements.

FIG. 9 shows a process for associating interactive track elements with video track elements. At step 901, a video track is created or opened at editing system 309. At step 903, a user may create an interactive track using editing system 309. At step 905, the editing system 309 associates an interactive track element with a video element. This association may be an explicit link to the video element from the interactive track element, or a relation of the video element to the interactive track element by their positions in the timeline. At step 906, the associating process ends.

Transmitting Interactive and Video Track Information

Figure 10:
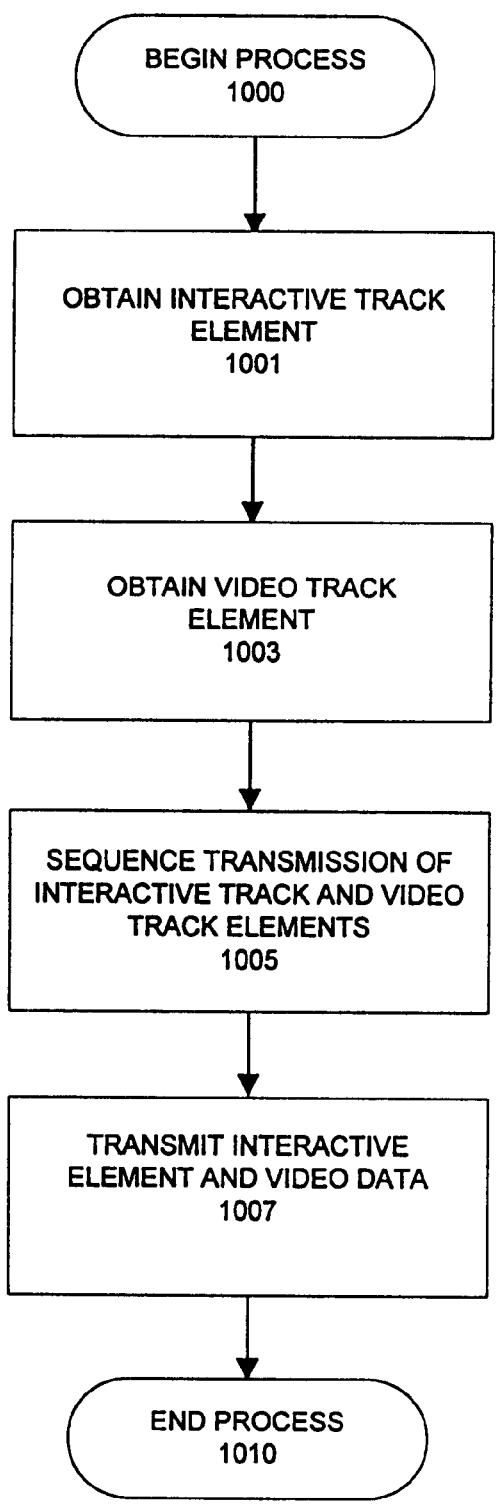
FIG. 10 is a flow chart showing a process for transmitting video and element data.

FIG. 10 shows a process for transmitting interactive and video track information. At step 1001, playback system 311 obtains an interactive element identified in the interactive track. This interactive track may have been defined previously using editing system 309. The interactive element may be, for example, stored as a file on storage system 209, or any other storage system throughout the network. This interactive track element may be placed in an interactive track buffer for transmission. Similarly, playback system 311 may obtain a video track element and place the element in a video track buffer for transmission at step 1003. At step 1005, playback system 311 may sequence the transmission of the interactive track and video elements. As discussed above, on or more of the interactive elements may need to be transmitted to the viewer before transmitting video track elements associated with the interactive elements. At block 1007, the interactive elements and video elements are transmitted. As discussed above, video elements may be transmitted as video data such as a video broadcast signal (e.g. NTSC signal) and the interactive elements may be transmitted as encoded data within the VBI of the video broadcast signal. Other methods of transmitting the video and interactive data are possible.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A method for processing a video signal, the method comprising steps of:

associating an interactive element to a portion of a video presentation to be transmitted over a transmission channel and displayed on a viewer, wherein the interactive element has a predefined relationship to the portion;

encoding the interactive element and transmitting the interactive element to the viewer relative to a transmission of the portion, wherein the encoding, of the element depends upon a bandwidth requirement for transmitting the interactive element and an bandwidth of the transmission channel, wherein an amount of bandwidth used from the transmission channel is configurable by the user; and wherein the transmitting of the element further depends upon a lead time that specifies how long, the interactive element is available at the viewer before the element is displayed.

2. A method for distributing a video signal produced by the method of claim 1.

3. A method for storing a video signal produced by the method of claim 1.

4. The method according to claim 1, wherein the step of associating includes a step of associating an interactive element to a video element by placing both the interactive element and the video element at a same starting position in a timeline.

5. The method according to claim 1, further comprising transmitting the interactive element at a predetermined time, wherein the predetermined time is a time before the transmission of the video element to ensure the interactive element is available for display at the viewer at a time that the video element is viewed.

6. The method according to claim 1, wherein the lead time is adjustable by a user.

7. The method according to claim 1, further comprising:
allowing, in a user interface of the editing system having at least one parameter of a group of parameters comprising at least one of:
bandwidth parameters of a data channel upon which the interactive element is transmitted;
a lead time indicating how long the interactive element is available at a destination before the interactive element is displayed; and
an indication whether interactive elements related to the interactive elements are to be transmitted to the destination.

8. A system for processing a video signal comprising:
means for-determining a time relation between a video broadcast and an interactive video element, the means for determining being responsive to a bandwidth requirement for transmitting the interactive video element and a bandwidth of a transmission channel upon which the interactive video element is transmitted, wherein an amount of bandwidth used is from the transmission channel configurable by the user;
means for inserting, into the video signal, the interactive element based on the time relation; and
wherein the means for determining comprises means for determining a lead time that specifies how long the interactive video element is available at a destination to which the element is transmitted, and wherein the time relation depends upon the lead time.

9. The system according to claim 8, further comprising an interface having at least one parameter of a group of parameters comprising at least one of:
bandwidth parameters of a data channel upon which the interactive element is transmitted;
a lead time indicating how long the interactive element is available at a destination before the interactive element is displayed; and
an indication whether interactive elements related to the interactive elements are to be transmitted to the destination.

10. A method for processing a video signal comprising steps of:
determining a time relation between a video broadcast and an interactive video element, the determining step being performed in response to a bandwidth requirement for transmitting the interactive video element and a bandwidth of a transmission channel upon which the interactive video element is transmitted, wherein an amount of bandwidth used from the transmission channel is configurable by the user;
inserting, into the video signal, the interactive element based on the time relation; and
determining a lead time that specifies how long the interactive video element is available at a destination to which the element is transmitted, and wherein the time relation depends on the lead time.

11. The method according to claim 10, further comprising:
allowing, in a user interface of the editing system, a user to adjust at least one parameter of a group of parameters comprising at least one of:
bandwidth parameters of a data channel upon which the interactive element is transmitted;
a lead time indicating how long the interactive element is available at a destination before the interactive element is displayed; and
an indication whether interactive elements related to the interactive elements are to be transmitted to the destination.

12. A method for processing a video signal comprising steps of:
receiving a composition of a multimedia presentation, the composition including one or more interactive elements having a time relation to one or more video elements, the time relation depending upon a bandwidth requirement for transmitting the interactive elements within a video signal and a bandwidth of a transmission channel within the video signal, wherein the amount of bandwidth used from the transmission channel is configurable by a user;
determining a lead time that specifies how long the interactive video element is available at a destination to which the element is transmitted, and wherein the time relation further depends on the lead time;
encoding the interactive elements within the video signal; and
transmitting the video signal.

13. The method according to claim 12, further comprising:
allowing, in a user interface of the editing system, a user to adjust at least one parameter of a group of parameters comprising at least one of:
bandwidth parameters of a data channel upon which the interactive element is transmitted;
a lead time indicating how long the interactive element is available at a destination before the interactive element is displayed; and
an indication whether interactive elements related to the interactive elements are to be transmitted to the destination.

14. A method for processing a video signal, the method comprising steps of:
associating an interactive element to a portion of a video presentation to be transmitted over a transmission channel and displayed on a viewer, wherein the interactive element has a predefined relationship to the portion;
encoding the interactive element and transmitting the interactive element to the viewer relative to a transmission of the portion, wherein the encoding of the element depends upon a bandwidth requirement for transmitting the interactive element and an bandwidth of the transmission channel, wherein an amount of bandwidth used from the transmission channel is configurable by the user; and
determining at least one associated element that is associated wit the interactive element, and wherein the transmitting of the element further depends upon a lead time that specifies how long the interactive element and the at least one associated element is available at the viewer before the interactive element is displayed.

15. The method according to claim 14, wherein the at least one associated element is dependent upon the interactive element.

16. The method according to claim 14, wherein the interactive element is a main interactive element referring a plurality of associated interactive elements.

17. The method according to claim 16, further comprising indicating, to a user, whether the plurality of associated interactive elements are transmitted with the main interactive element.

18. A system for processing a video signal comprising:
   means for determining a time relation between a video broadcast and an interactive video element, the means for determining being responsive to a bandwidth requirement for transmitting the interactive video element and a bandwidth of a transmission channel upon which the interactive video element is transmitted, wherein an amount of bandwidth used is from the transmission channel configurable by the user;
   means for inserting, into the video signal, the interactive element based on the time relation; and
   means for determining at least one related interactive element that is associated with the interactive video element and wherein the time relation depends upon a lead time that specifies how long the interactive video element and the at least one related interactive element are available at a destination to which the interactive video element and at least one related video element are transmitted before the interactive video element is displayed.

19. A method for processing a video signal comprising steps of:
   determining a time relation between a video broadcast and an interactive video element, the determining step being performed in response to a bandwidth requirement for transmitting the interactive video element and a bandwidth of a transmission channel upon which the interactive video element is transmitted, wherein an amount of bandwidth used from the transmission channel is configurable by the user;
   inserting, into the video signal, the interactive element based on the time relation; and
   determining at least one related interactive element that is associated with the interactive video element and wherein the time relation depends upon a lead time that specifies how long the interactive video element and the at least one related interactive element are available at a destination to which the interactive video element and at least one related video element are transmitted before the interactive video element is displayed.

20. A system for processing a video signal, the system comprising:
   a database storing a plurality of media objects;
   an editor configured to arrange one or more of the plurality of media objects in a composition, wherein at least one of the one or more media objects is an interactive element that is associated with a portion of a video presentation, and wherein the editor relates a transmission of the interactive element to a transmission of the portion, the transmission of the element depending upon a bandwidth requirement for transmitting the interactive element and a bandwidth of a communication channel upon which the element is transmitted, wherein the amount of bandwidth used from the transmission channel is configurable by a user; and
   a graphical user interface that displays an interactive track, the interactive track indicating a time at which the interactive element is displayed and a duration which the interactive element is displayed.

21. The system according to claim 20, further comprising a media playback system that transmits the composition to a viewer.

22. The system according to claim 20, wherein the composition is transmitted over a video transmission channel.

23. The system according to claim 22, wherein the composition includes at least one video element and at least one data element.

24. The system according to claim 23, wherein the data element is encoded and transmitted within a non-viewable portion of a video signal.

25. The system according to claim 24, wherein the non-viewable portion of the video signal has an available bandwidth, and the amount of the bandwidth used in the non-viewable portion of the video signal is configurable by a user.

26. The system according to claim 20, wherein at least one media object is represented by a component indicating a duration of samples of the media object.

27. The system according to claim 26, wherein a component is implemented using at least one object-oriented software object.

28. The system according to claim 20, further comprising an interface for allowing the user to adjust at least one parameter of a group of parameters comprising at least one of:
   bandwidth parameters of a data channel upon which the interactive element is transmitted;
   a lead time indicating how long the interactive element is available at a destination before the interactive element is displayed; and
   an indication whether interactive elements related to the interactive elements are to be transmitted to the destination.

29. A graphical user interface for allowing a user to edit a video presentation, the video presentation having a plurality of tracks including at least one interactive track, the interface comprising:
   an interface that displays the plurality of tracks in a timeline and displays, for an interactive element of the interactive track, a time and duration of display of the interactive element, and an amount of bandwidth of a transmission channel used by the interactive track is configurable by the user; and
   an interface for allowing the user to adjust at least one of a group of parameters comprising:
      bandwidth parameters of a data channel upon which the interactive element is transmitted;
      a lead time indicating how long the interactive element is available at a destination before the interactive element is displayed; and
      an indication whether interactive elements related to the interactive elements are to be transmitted to the destination.

30. The graphical user interface according to claim 29, wherein a representation of the interactive element is translated into commands to be executed on a playback system.

31. The graphical user interface according to claim 29, wherein the interactive element is associated with a portion of a video presentation.

32. The graphical user interface according to claim 31, wherein the portion of the video presentation is associated with one of the plurality of tracks.

33. The graphical user interface according to claim 29, wherein the duration of display of the interactive element is indicated by a length of the interactive element displayed in an interactive track.

34. A graphical user interface for allowing a user to edit a video presentation, the video presentation having a plurality of tracks including at least one interactive track, the interface comprising:

an interface that displays the plurality of tracks in a timeline and displays, for an interactive element of the interactive track, a time and duration of display of the interactive element, and an amount of bandwidth of a transmission channel used by the interactive track is configurable by the user; and wherein the interface is configured to alert the user if there is not enough time before the time of display of the interactive element for the interactive element to be transmitted.

35. A method for processing a video signal, the method comprising steps of:

associating an interactive element to a portion of a video presentation to be transmitted over a transmission channel and displayed on a viewer, wherein the interactive element has a predefined relationship to the portion;

encoding the interactive element and transmitting the interactive element to the viewer relative to a transmission of the portion, wherein the encoding of the element depends upon a bandwidth requirement for transmitting the interactive element and an bandwidth of the transmission channel, wherein an amount of bandwidth used from the transmission channel is configurable by the user; and alerting the user if there is not enough time before the display of the interactive element for the interactive element to be transmitted.

36. A system for processing a video signal comprising:

means for determining a time relation between a video broadcast and an interactive video element, the means for determining being responsive to a bandwidth requirement for transmitting the interactive video element and a bandwidth of a transmission channel upon which the interactive video element is transmitted, wherein an amount of bandwidth used is from the transmission channel configurable by the user;

means for inserting, into the video signal, the interactive element based on the time relation; and means for alerting the user if there is not enough time before the display of the interactive video element for the interactive video element to be transmitted.

37. A method for processing a video signal comprising steps of:

determining a time relation between a video broadcast and an interactive video element, the determining step being performed in response to a bandwidth requirement for transmitting the interactive video element and a bandwidth of a transmission channel upon which the interactive video element is transmitted, wherein an amount of bandwidth used from the transmission channel is configurable by the user;

inserting, into the video signal, the interactive element based on the time relation; and alerting the user if there is not enough time before the display of the interactive element for the interactive element to be transmitted.

38. A method for processing a video signal comprising steps of:

receiving a composition of a multimedia presentation, the composition including one or more interactive elements having a time relation to one or more video elements, the time relation depending upon a bandwidth requirement for transmitting the interactive elements within a video signal and a bandwidth of a transmission channel within the video signal, wherein the amount of bandwidth used from the transmission channel is configurable by a user;

encoding the interactive elements within the video signal;

transmitting the video signal; and alerting the user if there is not enough time before the display of interactive element for the interactive element to be transmitted.

39. A system for processing a video signal, the system comprising:

a database storing a plurality of media objects;

an editor configured to arrange one or more of the plurality of media objects in a composition, wherein at least one of the one or more media objects is an interactive element that is associated with a portion of a video presentation, and wherein the editor relates a transmission of the interactive element to a transmission of the portion, the transmission of the element depending upon a bandwidth requirement for transmitting the interactive element and a bandwidth of a communication channel upon which the element is transmitted, wherein the amount of bandwidth used from the transmission channel is configurable by a user; and wherein the editor is configured to alert the user if there is not enough time before a display of the interactive element for the interactive element to be transmitted.

40. A system for allowing a user to edit a video presentation, the video presentation having a plurality of tracks including at least one interactive track, the system comprising a graphical user interface that displays a timeline representing the video presentation and including a track for each of the plurality of tracks in the video presentation, including an interactive track, wherein the interactive track indicates a time at which each interactive element is displayed at a destination and a duration for which each interactive element is displayed, wherein the interactive track further indicates a duration of transmission of the interactive element prior to display of the interactive element at the destination, wherein the graphical user interface further comprises:

an interface for allowing the user to adjust parameters for interactive element, comprising:

bandwidth parameters of a data channel upon which the interactive element is transmitted;

a lead time indicating how long the interactive element is available at a destination before the interactive element is displayed; and an indication whether interactive elements related to the interactive element are to be transmitted to the destination.

41. The system of claim 40, wherein the duration of transmission of an interactive element indicated on the interactive track is determined according to the bandwidth parameters, the letad time, the indication whether interactive elements related to the interactive element are to be transmitted to the destination, and an amount of data representing the interactive element.

42. The system of claim wherein the graphical user interface is configured to alert the user if there is not enough time before the time of display of the interactive element for the interactive element to be transmitted to the destination.

43. A system for allowing a user to edit a video presentation, the video presentation having a plurality of tracks including at least one interactive track, the system comprising a graphical user interface that displays a timeline representing the video presentation and including a track for each of the plurality of tracks in the video presentation, including an interactive track, wherein the interactive track indicates a time at which each interactive element is displayed at a destination and a duration for which each interactive element is displayed, wherein the interactive track further indicates a duration of transmission of the interactive element prior to display of the interactive element at the destination, wherein the duration of transmission of an interactive element indicated on the interactive track is determined according to a lead time indicating how long the interactive element is available at a destination before the interactive element is displayed.

44. A system for allowing a user to edit a video presentation, the video presentation having a plurality of tracks including at least one interactive track, the system comprising a graphical user interface that displays a timeline representing the video presentation and including a track for each of the plurality of tracks in the video presentation, including an interactive track, wherein the interactive track indicates a time at which each interactive element is displayed at a destination and a duration for which each interactive element is displayed, wherein the interactive track further indicates a duration of transmission of the interactive element prior to display of the interactive element at the destination, wherein the duration of transmission of an interactive element indicated on the interactive track is determined according to whether interactive elements related to the interactive element are to be transmitted to the destination.

45. A system for allowing a user to edit a video presentation, the video presentation having a plurality of tracks including at least one interactive track, the system comprising a graphical user interface that displays a timeline representing the video presentation and including a track for each of the plurality of tracks in the video presentation, including an interactive track, wherein the interactive track indicates a time at which each interactive element is displayed at a destination and a duration for which each interactive element is displayed, wherein the interactive track further indicates a duration of transmission of the interactive element prior to display of the interactive element at the destination, wherein the graphical user interface is configured to alert the user if there is not enough time before the time of display of the interactive element for the interactive element to be transmitted to the destination.

\* \* \* \* \*